Figure 1:
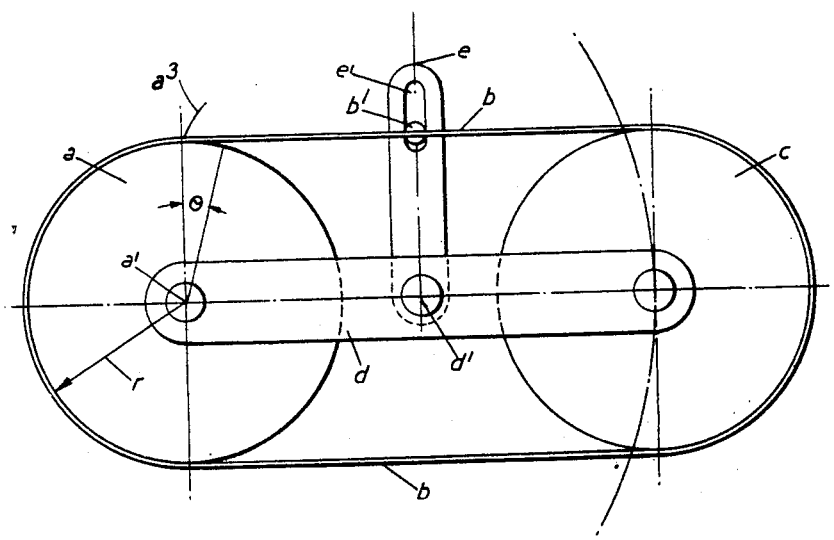

May 20, 1947.  E. A. COOKE  2,420,931
APPARATUS FOR GENERATING INVOLUTES
Filed Oct. 10, 1944   23 Sheets-Sheet 1

Inventor
Ernest A. Cooke
By
Emery, Holcombe & Blair
Attorney

Inventor
Ernest A. Cooke
By
Emery, Holcombe & Blair
Attorney

May 20, 1947. E. A. COOKE 2,420,931
APPARATUS FOR GENERATING INVOLUTES
Filed Oct. 10, 1944 23 Sheets-Sheet 4

Inventor
Ernest A. Cooke
By
Emery, Holcombe & Blair
Attorney

May 20, 1947.  E. A. COOKE  2,420,931
APPARATUS FOR GENERATING INVOLUTES
Filed Oct. 10, 1944  23 Sheets-Sheet 6

Inventor
Ernest A. Cooke
By
Emery, Holcombe Blair
Attorney

May 20, 1947.                    E. A. COOKE                    2,420,931
              APPARATUS FOR GENERATING INVOLUTES
                 Filed Oct. 10, 1944         23 Sheets-Sheet 7

Inventor
Ernest A. Cooke
By
Emery, Holcombe & Blair
Attorney

May 20, 1947.　　　E. A. COOKE　　　2,420,931
APPARATUS FOR GENERATING INVOLUTES
Filed Oct. 10, 1944　　　23 Sheets-Sheet 8

Inventor
Ernest A. Cooke
By
Emery, Holcombe & Blair
Attorney

May 20, 1947.  E. A. COOKE  2,420,931
APPARATUS FOR GENERATING INVOLUTES
Filed Oct. 10, 1944  23 Sheets-Sheet 9

Inventor
Ernest A. Cooke
By
Emery, Holcombe & Blair
Attorney

May 20, 1947.  E. A. COOKE  2,420,931
APPARATUS FOR GENERATING INVOLUTES
Filed Oct. 10, 1944   23 Sheets-Sheet 10
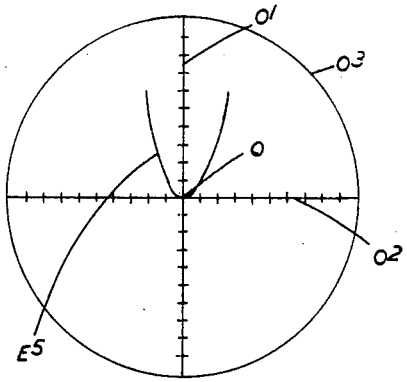
FIG.15.
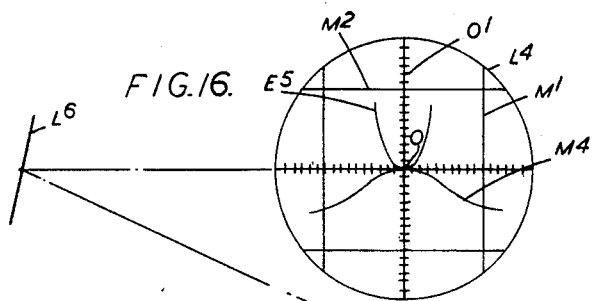
FIG.16.
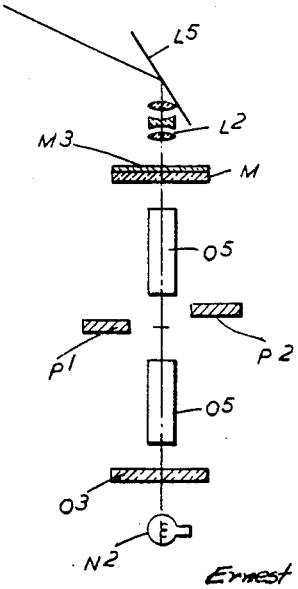
Inventor
Ernest A. Cooke
By
Emery, Holcombe & Blair
Attorney May 20, 1947.  E. A. COOKE  2,420,931
APPARATUS FOR GENERATING INVOLUTES
Filed Oct. 10, 1944   23 Sheets-Sheet 12

Inventor
*Ernest A. Cooke*
By
*Emery, Holcombe & Blair*
Attorney

May 20, 1947. E. A. COOKE 2,420,931
APPARATUS FOR GENERATING INVOLUTES
Filed Oct. 10, 1944 23 Sheets-Sheet 13

Inventor
Ernest A. Cooke
By
Emery, Holcombe & Blair
Attorney

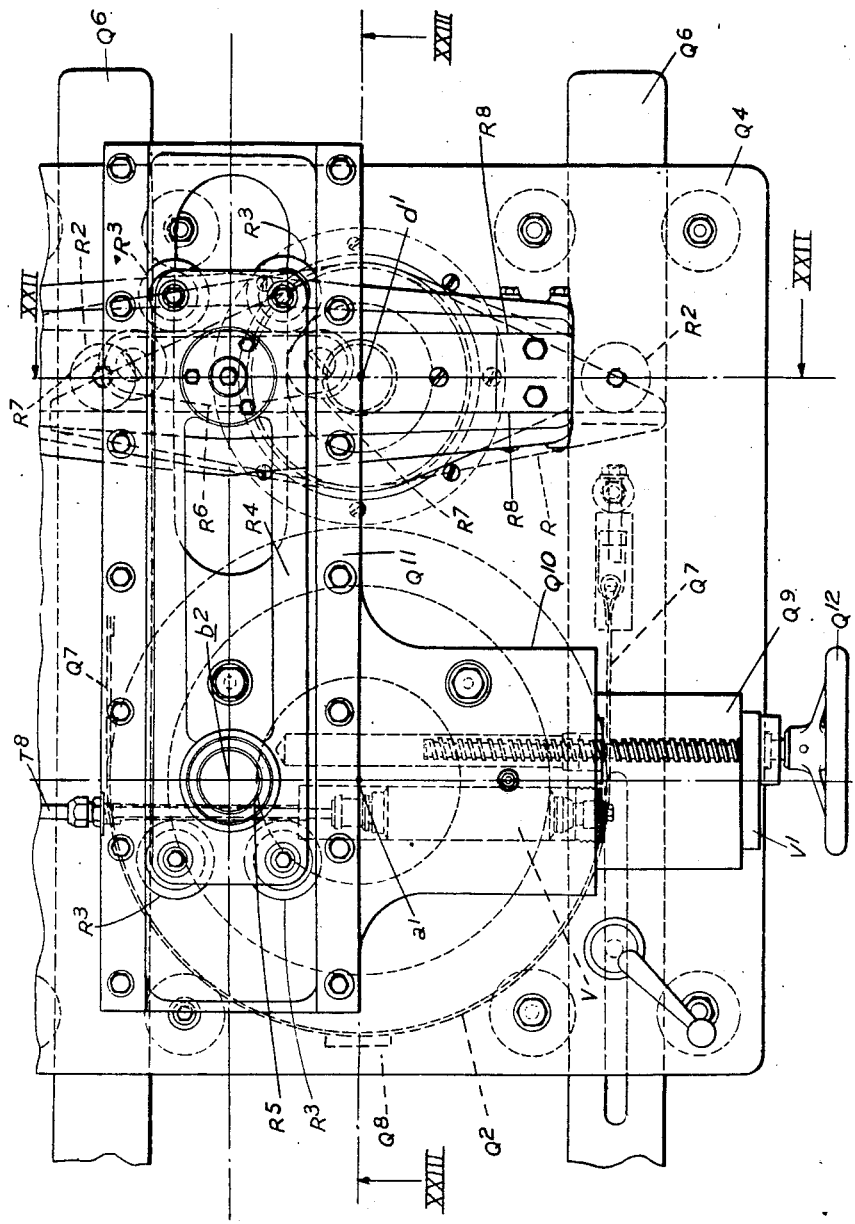

May 20, 1947. E. A. COOKE 2,420,931
APPARATUS FOR GENERATING INVOLUTES
Filed Oct. 10, 1944 23 Sheets-Sheet 15
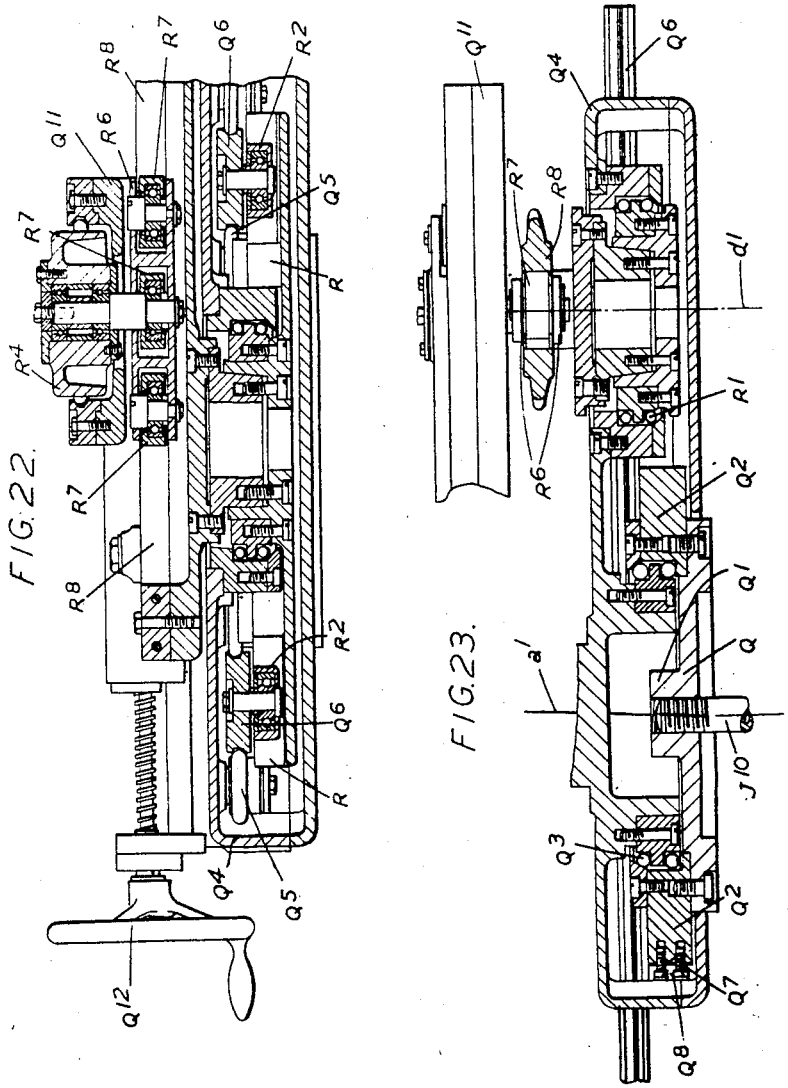
Inventor
ERNEST A. COOKE
By
Emery, Holcombe & Blair
Attorney May 20, 1947.                    E. A. COOKE                     2,420,931
                        APPARATUS FOR GENERATING INVOLUTES
                    Filed Oct. 10, 1944        23 Sheets-Sheet 16
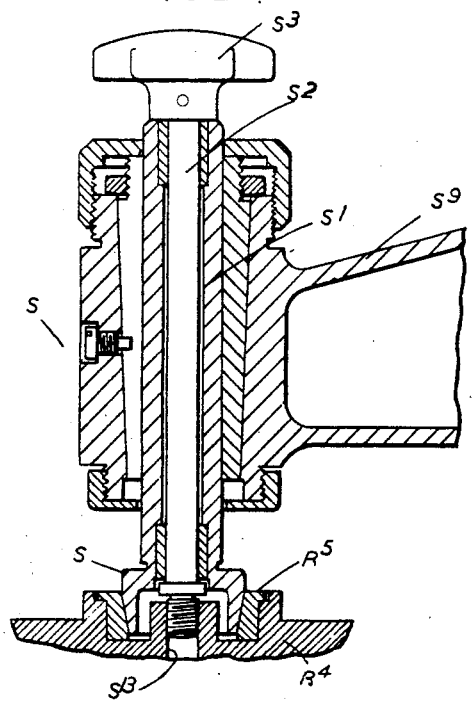
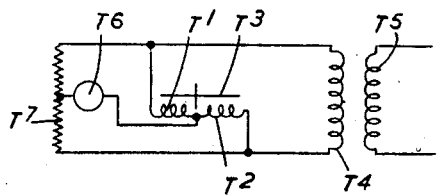
Inventor
ERNEST A. COOKE
By
Emery, Holcombe & Blair
                Attorney May 20, 1947.  E. A. COOKE  2,420,931
APPARATUS FOR GENERATING INVOLUTES
Filed Oct. 10, 1944  23 Sheets-Sheet 17

Inventor
ERNEST A. COOKE
By
Emery, Holcombe & Blair
Attorney

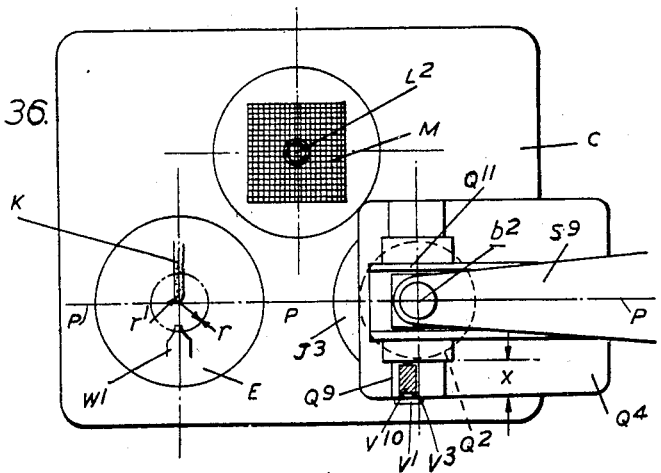
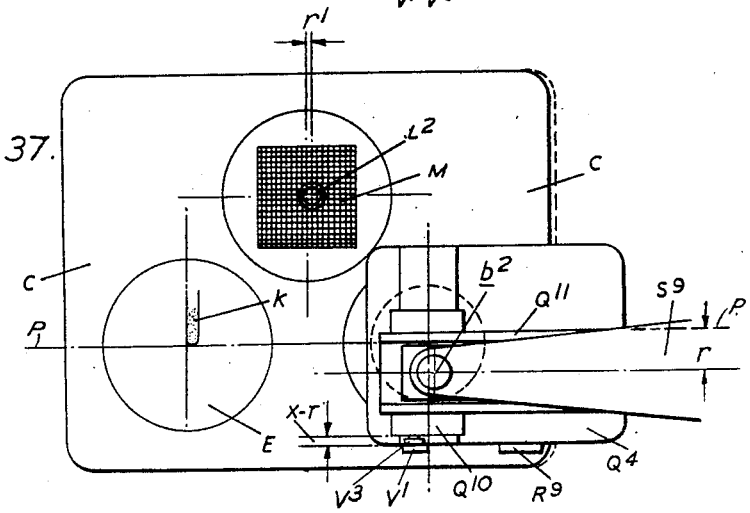
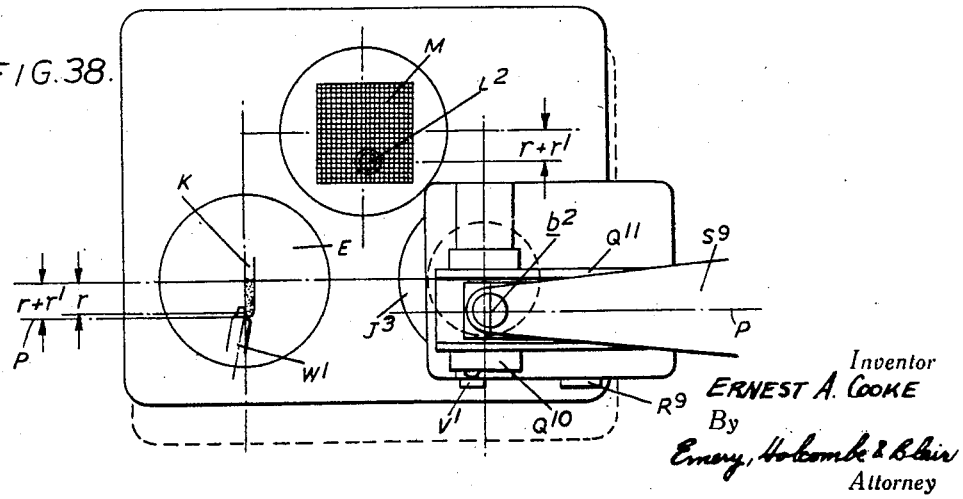

Inventor
ERNEST A. COOKE
By
Emery, Holcombe & Blair
Attorney

May 20, 1947.   E. A. COOKE   2,420,931
APPARATUS FOR GENERATING INVOLUTES
Filed Oct. 10, 1944    23 Sheets-Sheet 22

Inventor
ERNEST A. COOKE
By
Emery, Holcombe & Blair
Attorney

May 20, 1947. E. A. COOKE 2,420,931
APPARATUS FOR GENERATING INVOLUTES
Filed Oct. 10, 1944 23 Sheets-Sheet 23

Inventor
ERNEST A. COOKE
By
Emery, Holcombe & Blair
Attorney

Patented May 20, 1947

2,420,931

UNITED STATES PATENT OFFICE 2,420,931

APPARATUS FOR GENERATING INVOLUTES

Ernest Albert Cooke, Leicester, England, assignor to Taylor, Taylor & Hobson Limited, Leicester, England, a company of Great Britain Application October 10, 1944, Serial No. 558,070
In Great Britain July 20, 1943

20 Claims. (Cl. 51—95)

This invention relates to apparatus for generating involutes and is directed particularly, though not exclusively to apparatus for checking and forming, e. g., by grinding, gears, cutting tools, gauges and the like which incorporate involute forms.

Apparatus according to the present invention comprises a radius element mounted to pivot about a main axis and whose effective length is equal to the radius of the base circle corresponding to the involute to be generated, a tangent element connected at right angles to the radius element and tangential to the base circle, a follower adjustable along the tangent element, and means whereby angular adjustment of the two elements about the main axis causes the follower to be adjusted along the tangent element through a distance equal to the arc subtended on the base circle by the said angle, the follower thus describing the involute curve corresponding to the base circle.

In a preferred construction, the apparatus comprises a link and a base plate which are relatively rotatable about the main axis, and interconnecting mechanism between the link, the base plate and follower, the arrangement being such that relative angular movement between the base plate and the link about the main axis causes the follower to move along the tangent element through a distance equal to the length of the arc subtended by the said angle on the base circle.

It will thus be seen that the apparatus evaluates the function $$\frac{\pi r \theta}{180}$$

wherein $r$ is the effective length of the radius element (i. e., the radius of the base circle), and $\theta$ the angle through which the two elements are turned about the main axis, so that if, as is preferred, the effective length of the radius element is adjustable, the apparatus can be employed for generating a plurality of involute curves based respectively on a number of different base circles.

The involute generating apparatus according to the invention may either be used in conjunction with an existing machine or may be employed by itself, say, for checking existing involutes or copies. For example, the apparatus may comprise a supporting base, to which the base disc is secured whilst the link is angularly adjustable upon the base about the main axis coincident with the central axis of the base disc, a tool or tracer support, a work or copy support, and means whereby relative movement between the tool and the work supports, or between the tracer and the copy supports, is a reproduction of the relative movement between the follower and the main axis.

Figure 2:
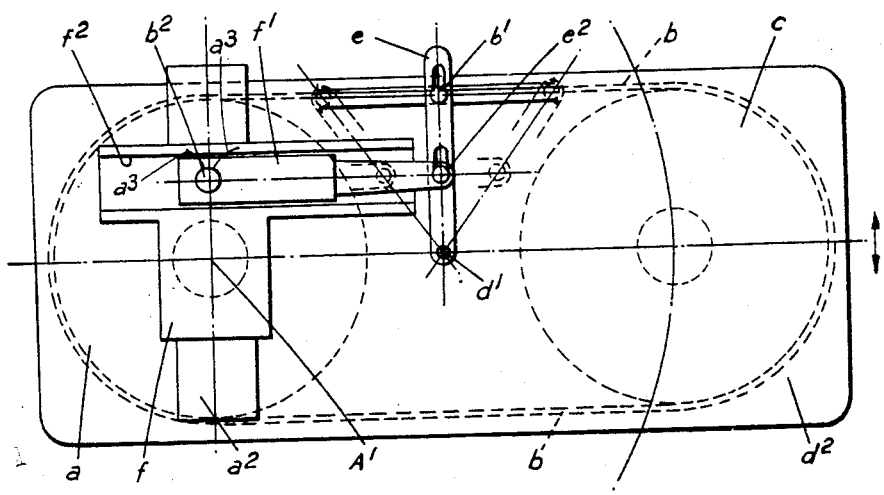
Figure 3:
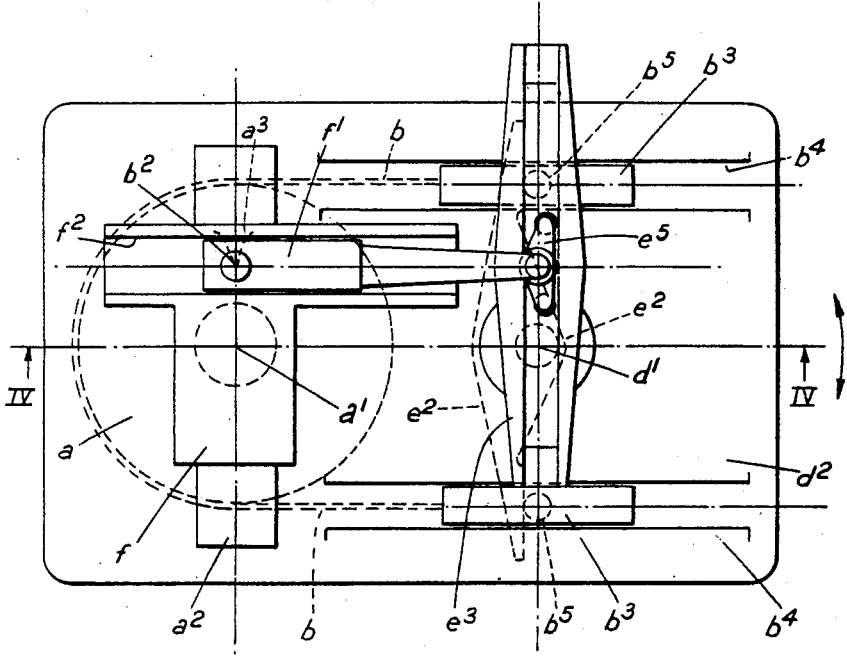
Figure 4:
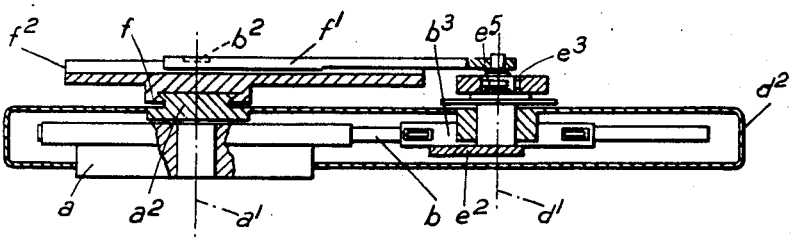
Figure 5:
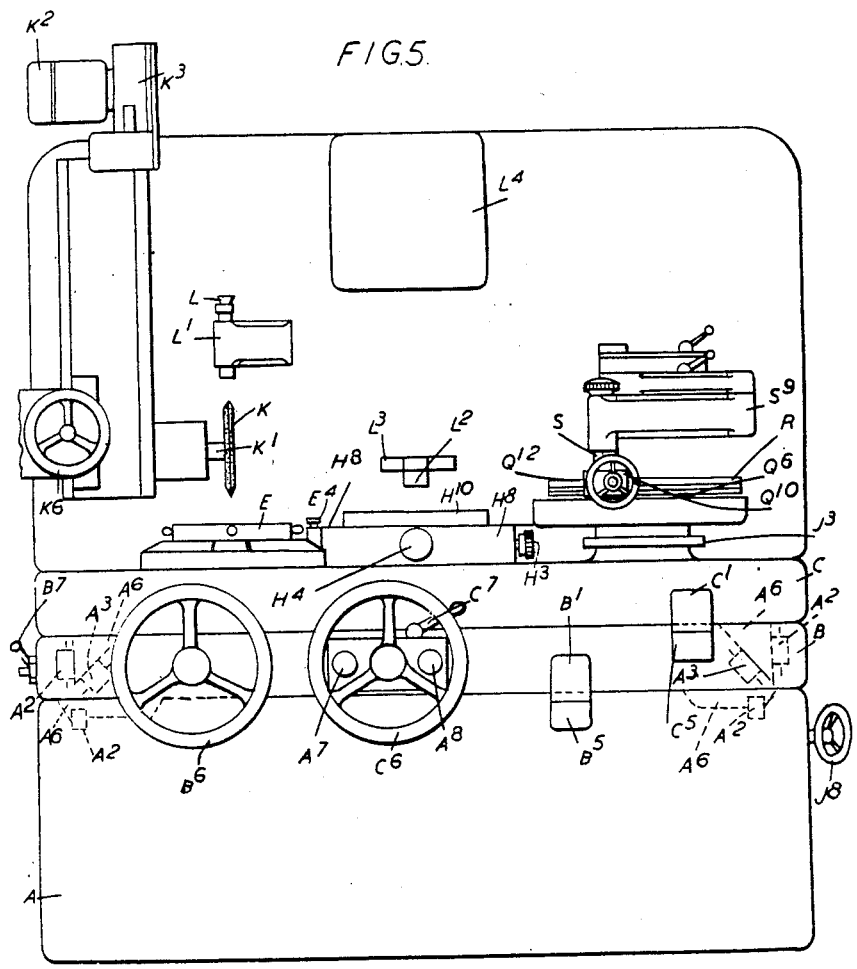
Figure 6:
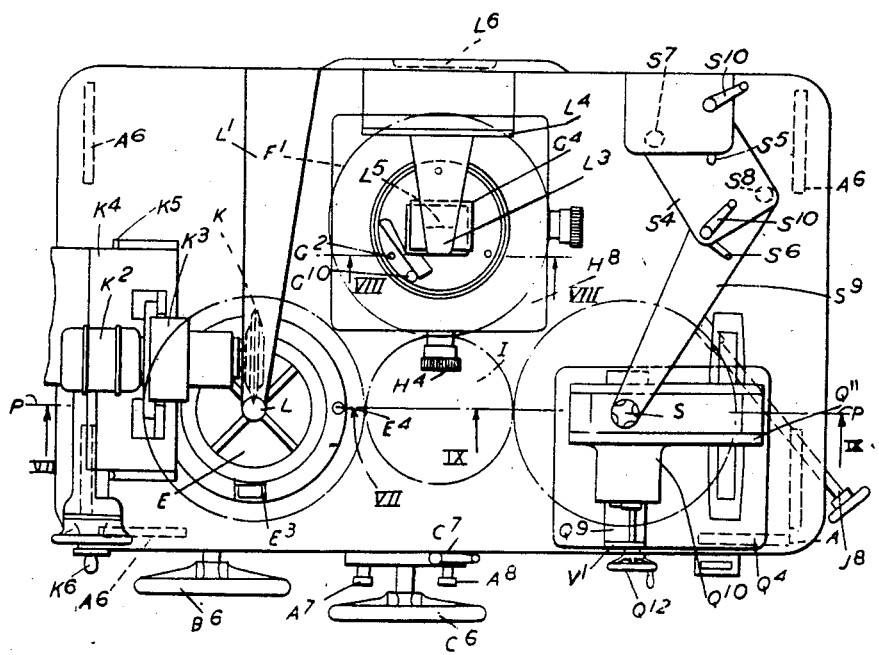
Figure 7:
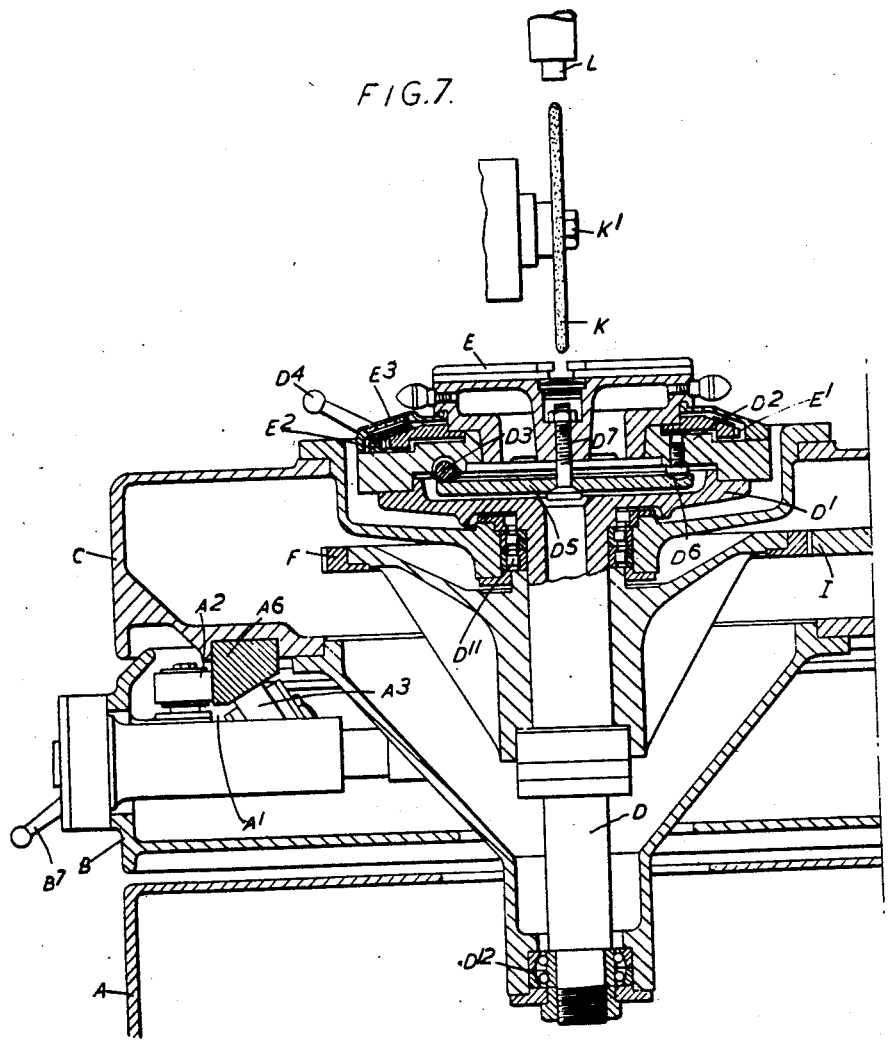
Figure 8:
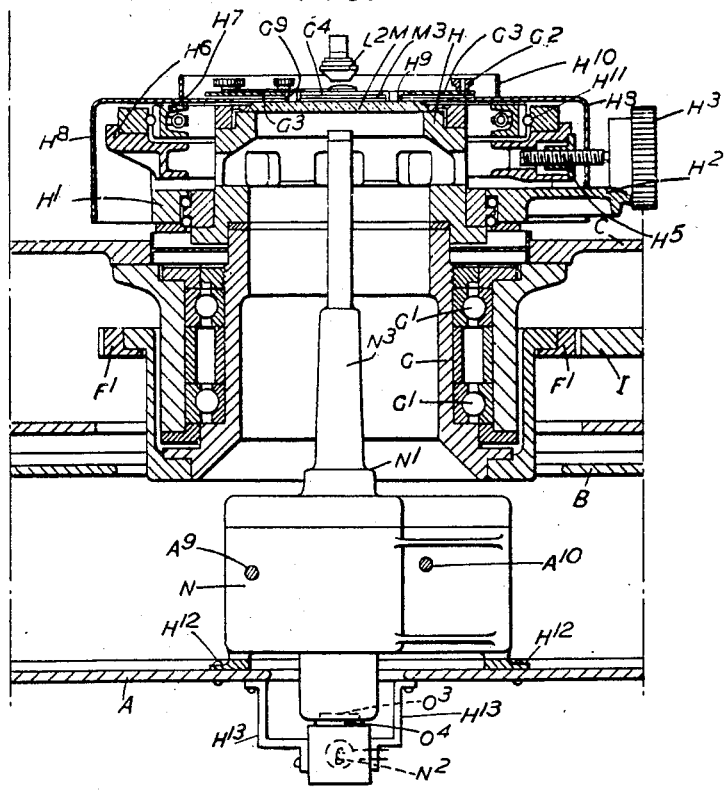
Figure 12:
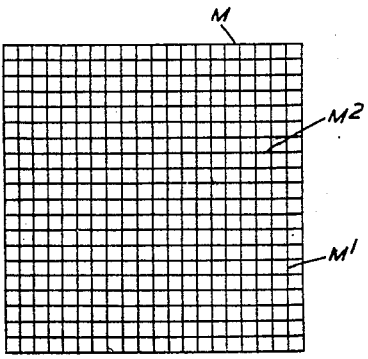
Figure 9:
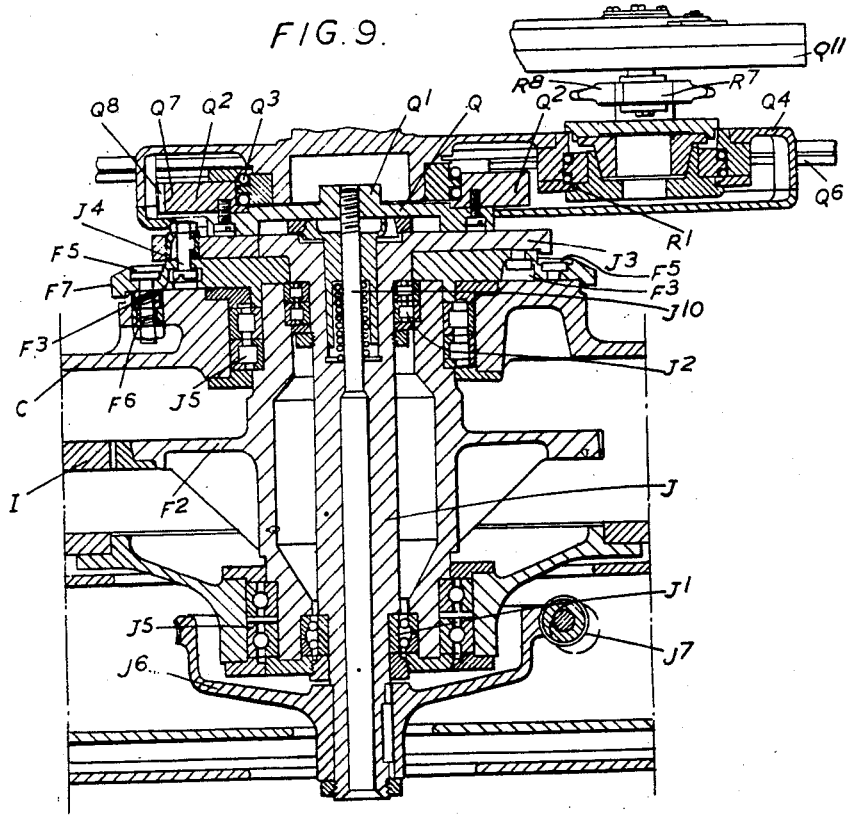
Figure 11:
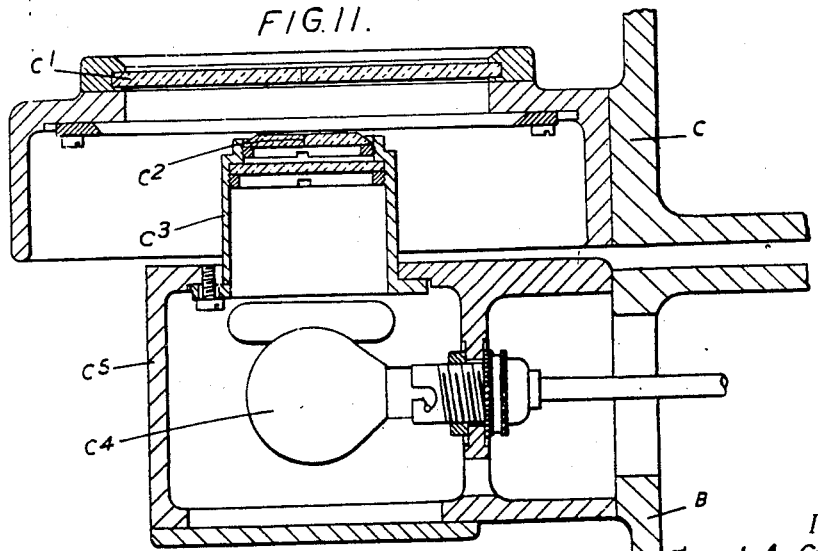
Figure 10:
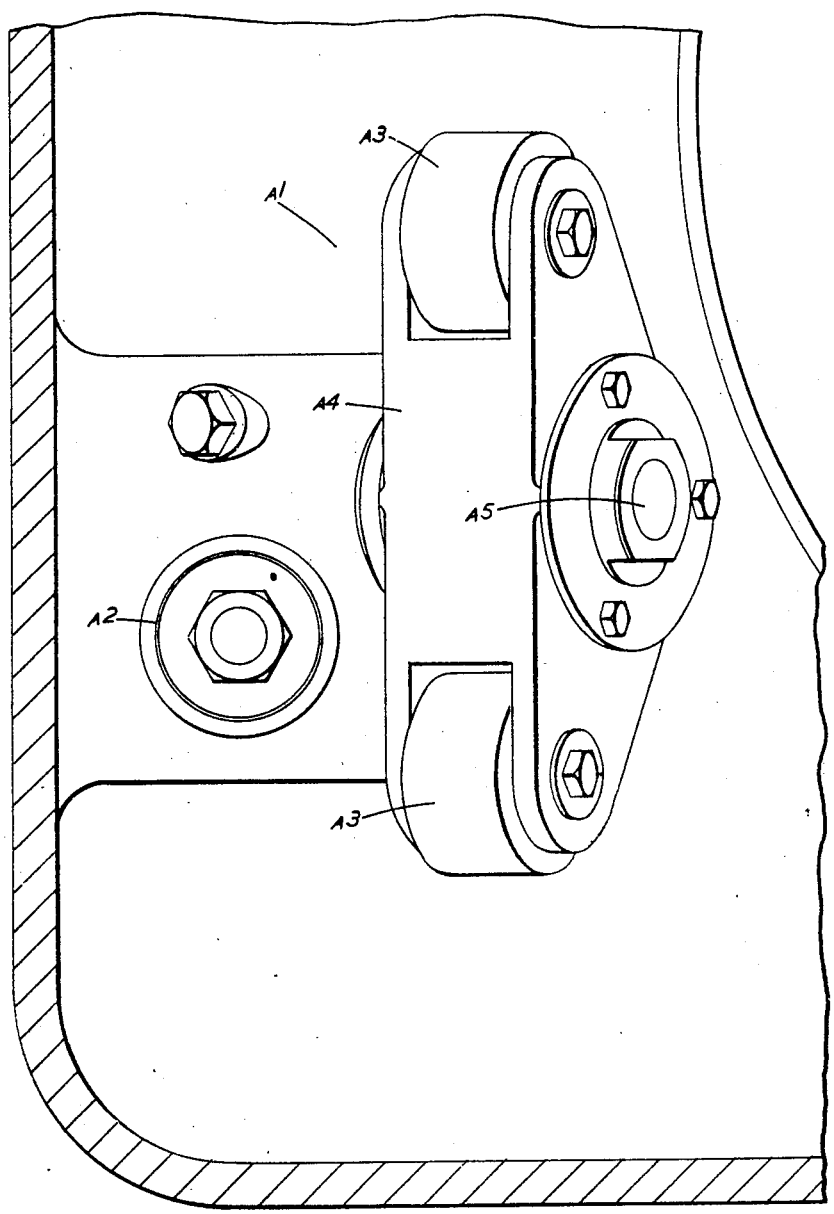
Figure 13:
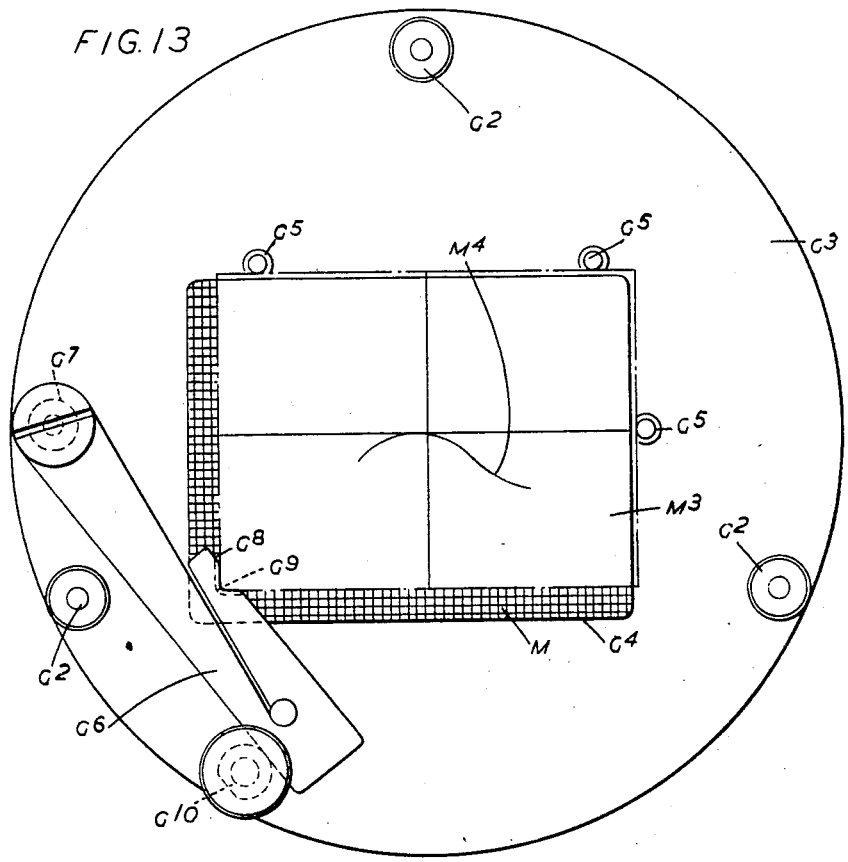
Figure 14:
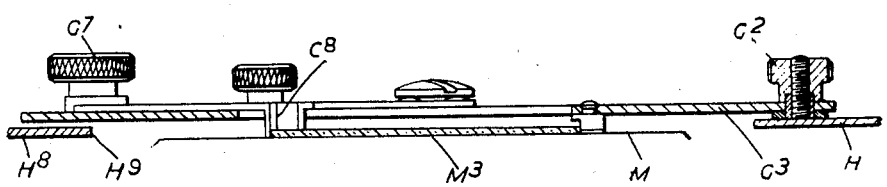
Figure 17:
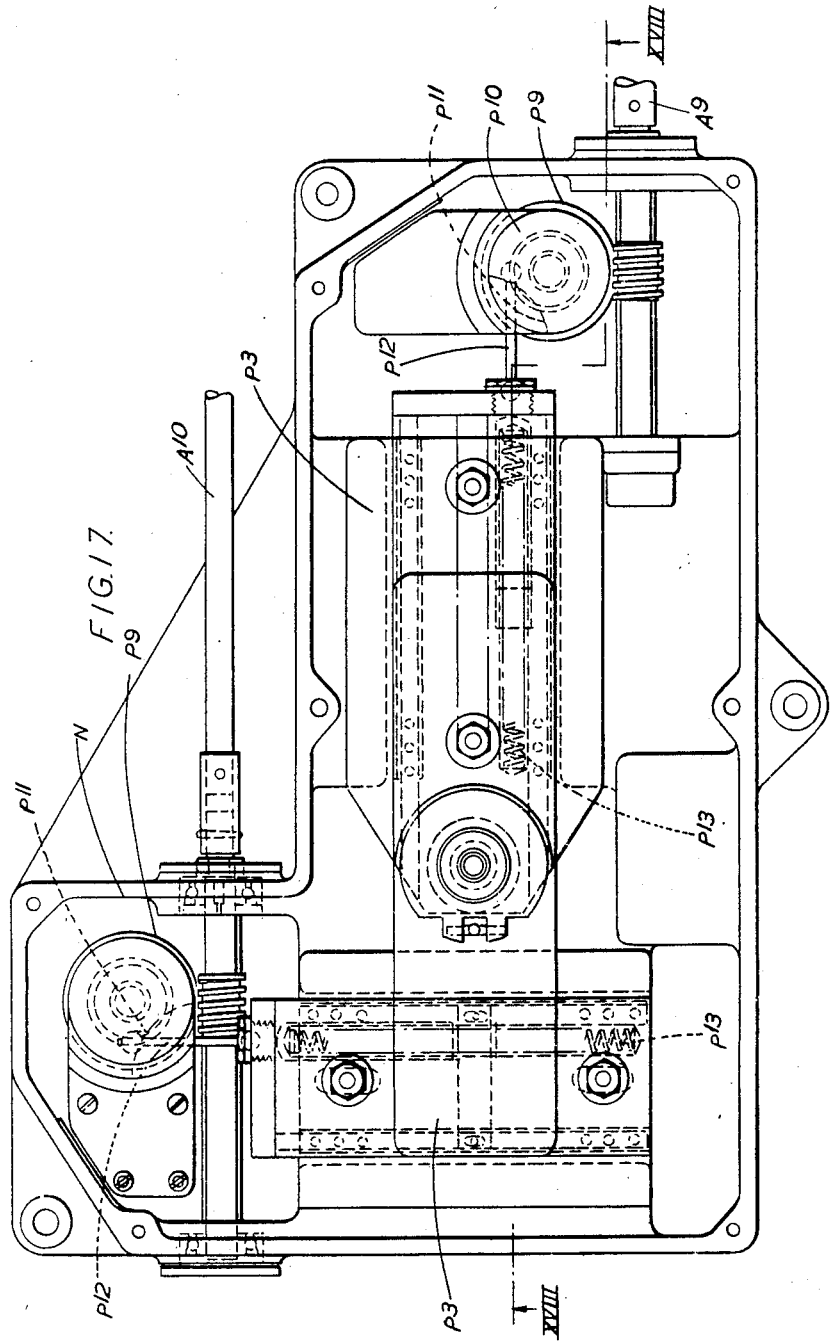
Figure 18:
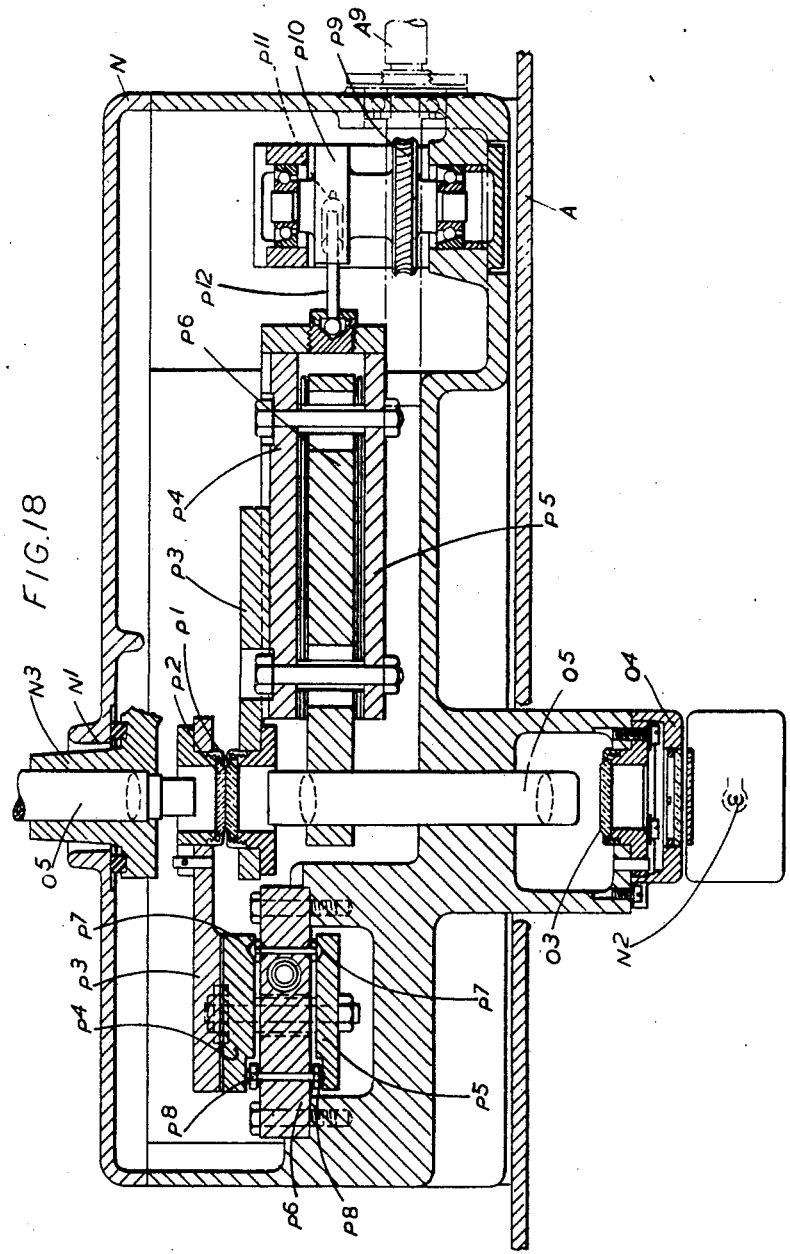
Figure 19:
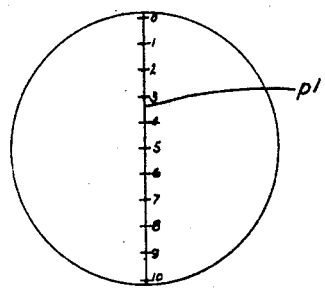
Figure 20:
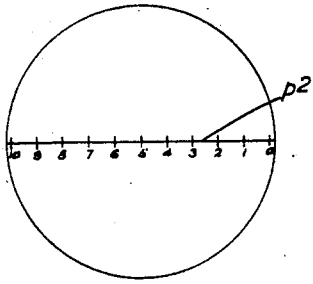
Figure 26:
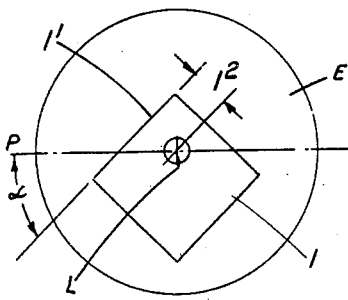
Figure 27:
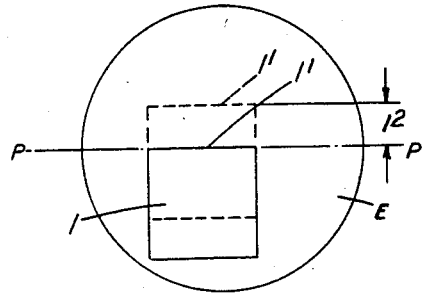
Figure 31:
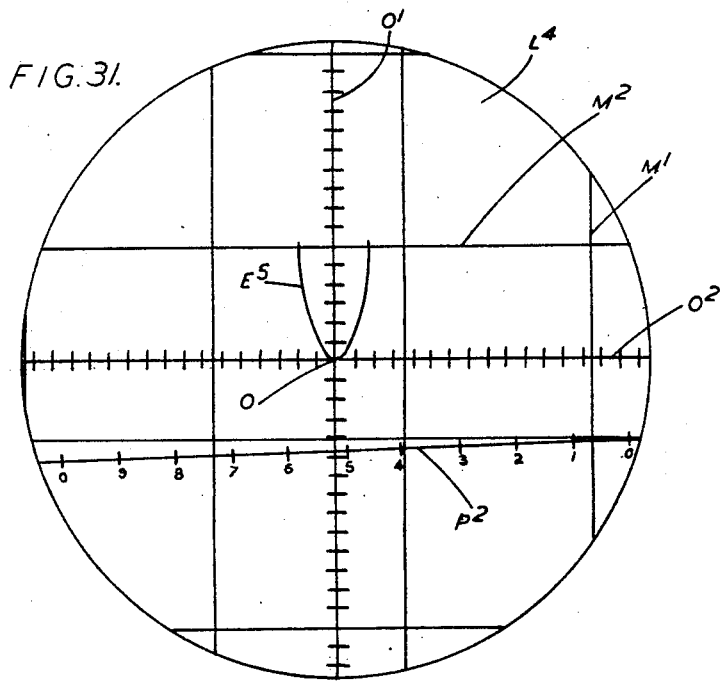
Figure 32:
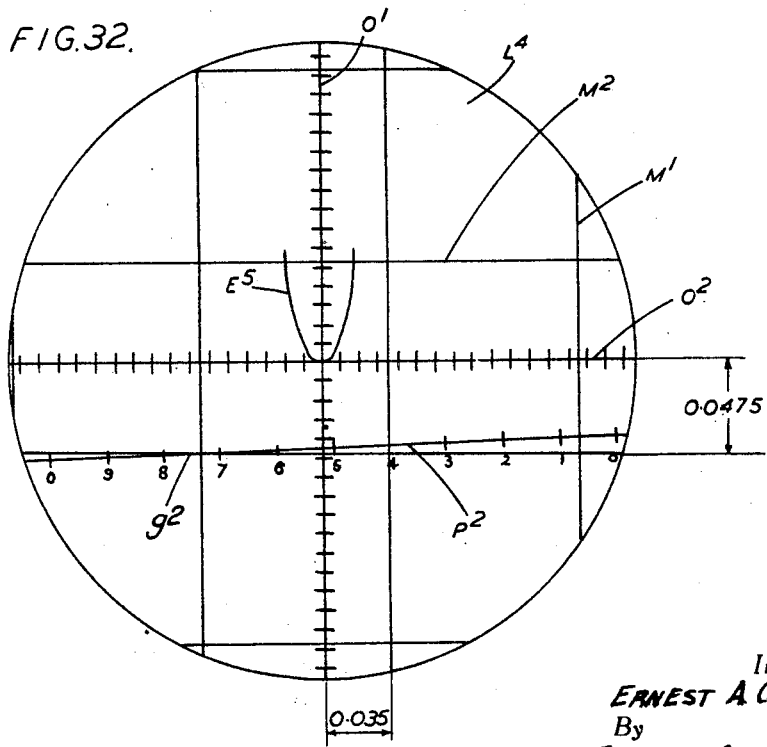
Figure 33:
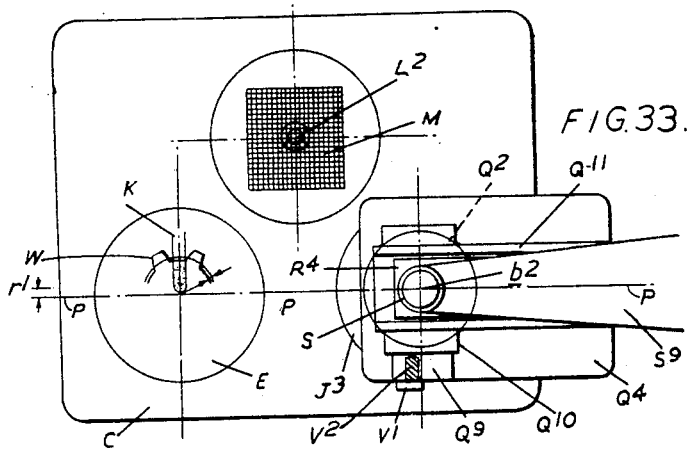
Figure 34:
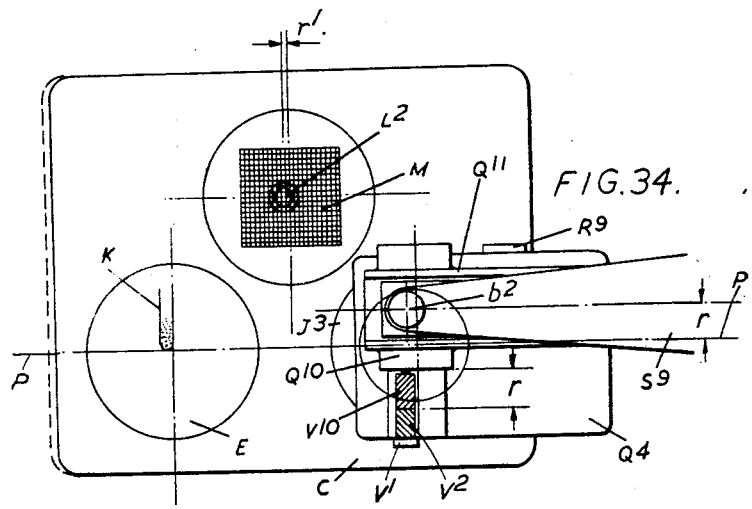
Figure 35:
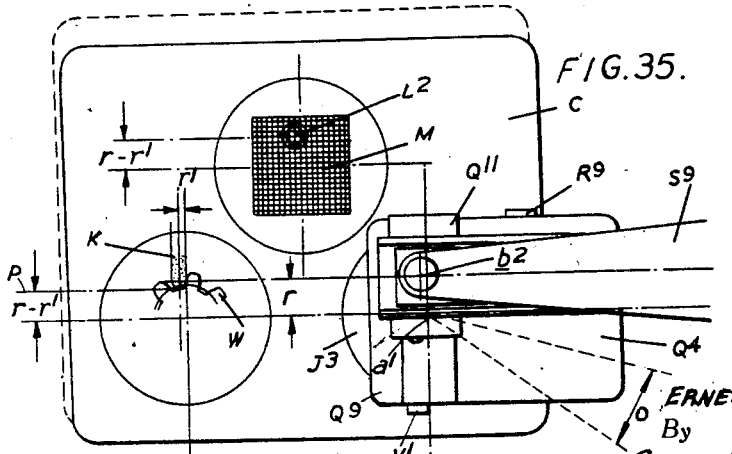
Figure 39:
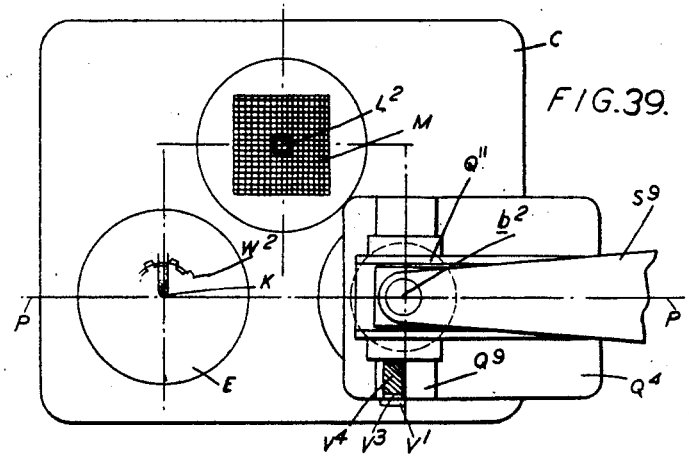
Figure 40:
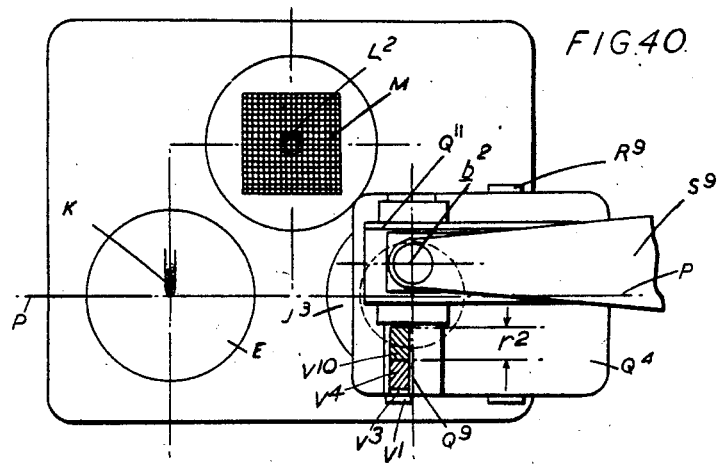
Figure 41:
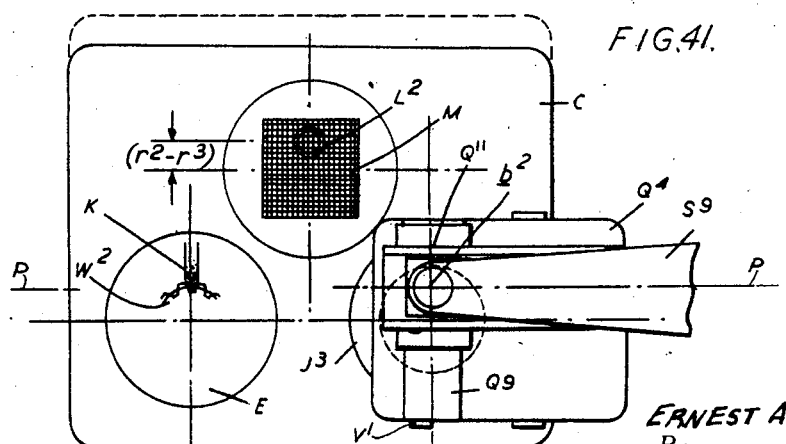
Figure 42:
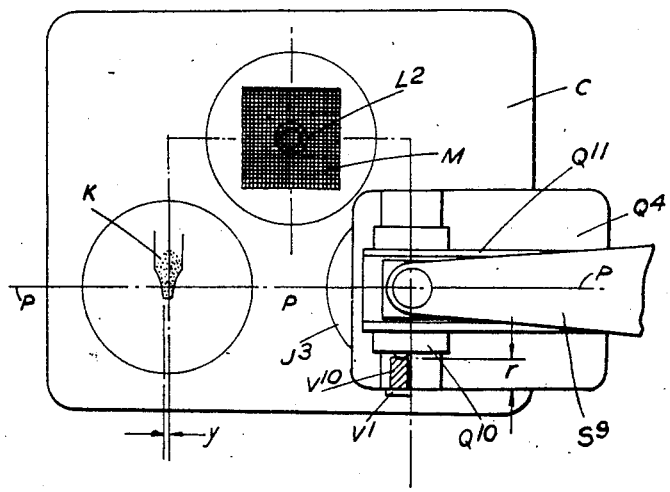
Figure 43:
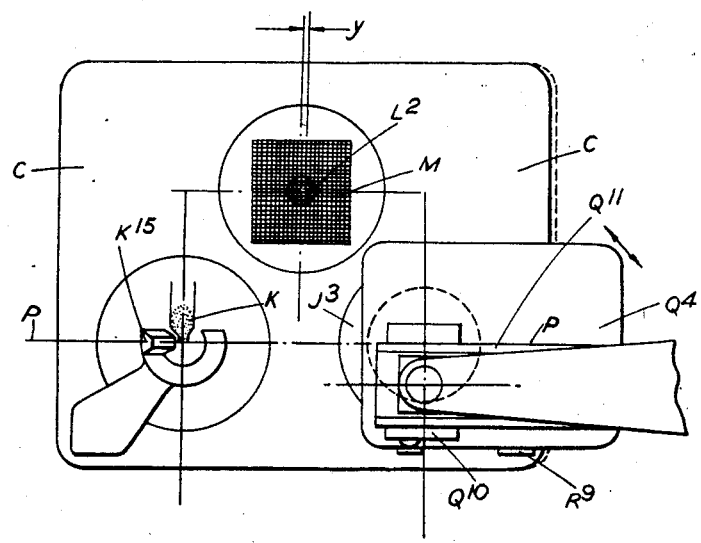
Figure 44:
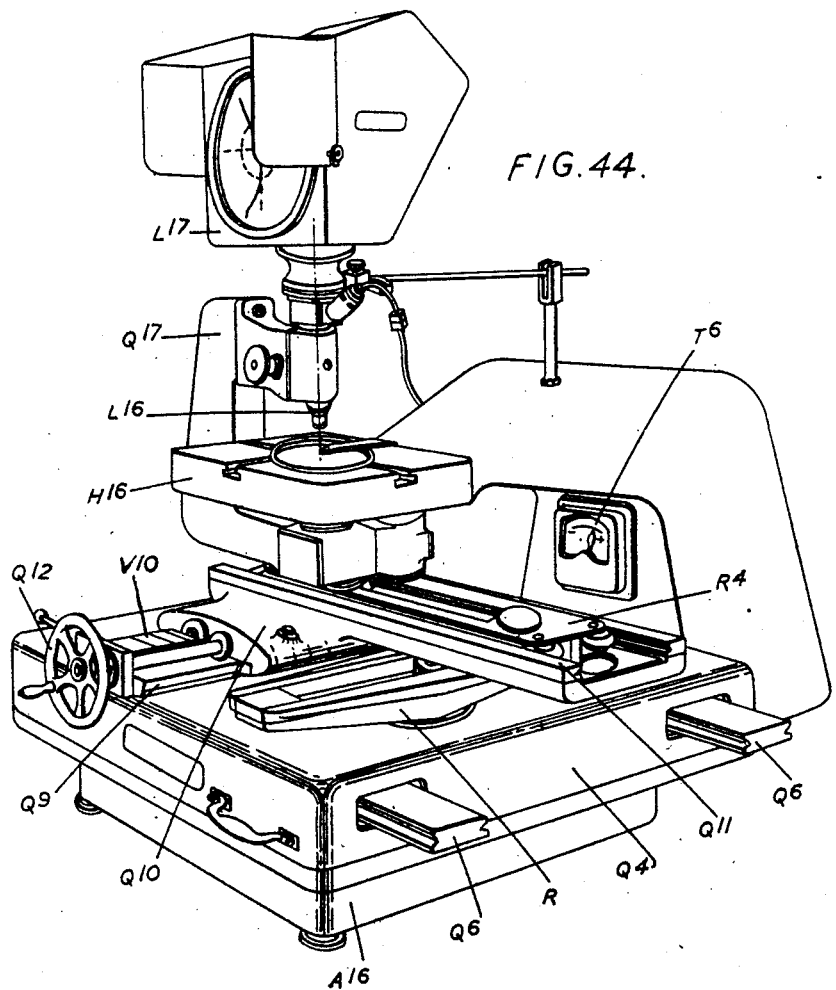

The invention may be carried into practice in various ways but two constructions, each embodying the invention are shown, by way of example, in the accompanying drawings, in which Figure 1 illustrates the basic principle of the invention, Figure 2 is a diagrammatic representation of one arrangement for producing the involute path indicated in Figure 1, Figures 3 and 4 show respectively in plan and section a modified arrangement, Figure 5 is a front elevation of a projection copying machine having an involute attachment corresponding to that shown diagrammatically in Figures 3 and 4, Figure 6 shows the machine in plan, Figure 7 is a section on the line VII—VII of Figure 6, Figure 8 is a section on the line VIII—VIII of Figure 6, Figure 9 is a section on the line IX—IX of Figure 6, but omitting the anchoring spigot, Figure 10 shows one set of bearings for the slides, on an enlarged scale, Figure 11 illustrates in vertical section, and also on an enlarged scale, one of the two course adjustment indicators included in Figure 5, Figure 12 is a plan of the grid included in Figure 8, Figures 13 and 14 illustrate, respectively in plan and vertical section, the contour holder included in Figure 8, Figure 15 shows the fixed graticule associated with the coordinate setting unit included in Figure 8, Figure 16 is a diagrammatic representation of the optical system associated with the copy shaft shown in Figure 8, the projection screen being, for convenience of illustration, shown turned through 90°, Figure 17 is a horizontal section of the coordinate setting apparatus included in Figures 8 and 16, Figure 18 is a section on the line XVIII—XVIII of Figure 17, Figures 19 and 20 show the two movable graticules included in Figures 16 and 18, Figure 21 illustrates the involute attachment in plan and on an enlarged scale, Figure 22 is a section on the line XII—XII of Figure 21, Figure 23 is a section on the line XXIII—XXIII of Figure 21 but omitting the radius element and datum socket, Figure 24 illustrates, in vertical section and on an enlarged scale, the anchoring spigot which cooperates with the jockey unit of Figure 21, Figure 25 is a wiring diagram of the circuit through which the linear dimension gauge included in Figure 21 controls the measuring instrument (not shown), Figures 26 and 27 represent diagrammatically the steps for adjusting the machine for straight-line grinding, Figures 28 to 32 are diagrams of the images on the screen during successive steps in setting the machine in accordance with two cartesian coordinates, Figures 33 to 35 show diagrammatically the steps for setting the machine to generate a convex involute by translatory grinding, Figures 36 to 38 are similar illustrations of the steps for setting the machine to generate a concave involute by translatory grinding, Figures 39 to 41 similarly illustrate the settings for generating a convex involute by gyratory grinding, Figures 42 and 43 illustrate, in a similar manner the settings for generating a concave involute by translatory grinding, and Figure 44 shows, in perspective, the application of the invention to a separate unit for testing the accuracy of finished involutes.

In the arrangement diagrammatically shown in Figure 1, the apparatus comprises a base plate constituted by a circular disc or drum $a$ having its circumference connected by flexible bands, cords or the like $b$ to the circumference of a subsidiary disc or drum $c$ having a radius equal to that of the drum $a$, the two drums $a$ and $c$ being angularly adjustable about pivots at opposite ends of a link $d$. Pivotally connected to the link $d$ at a point $d^1$ intermediate of the ends of the link is a lever $e$ slotted at $e^1$ to receive a follower pin $b^1$ secured to one of the bands $b$. Thus, assuming that the radius $r$ of the base plate or drum $a$ is equal to the radius of the base circle corresponding to the involute to be generated, when the drum $c$, link $d$ and lever $e$ are swung about the axis $a^1$ of the drum $a$ (hereinafter referred to as the main axis) through an angle $\theta$ the follower pin $b^1$ will not only move in the direction of the length of the band $b$ through a distance equal to the length of the arc subtended by the angle $\theta$, but also through the angular distance $\theta$ about the main axis $a^1$. The tangential unwrap at the periphery of the drum is thus represented by the value $$\frac{2\pi r\theta}{360} \text{ or } \frac{\pi r\theta}{180}$$

where $r$ is the effective length of the radius element (i. e., the radius of the base plate or drum $a$). If therefore the effective length of the radius element is adjustable, at will, the apparatus can be employed for generating any one of a plurality of involute curves (for example $a^3$) based respectively on a number of different base circles.

One such arrangement is diagrammatically illustrated in Figure 2, in which the base plate or drum $a$ carries a transverse guide $a^2$ along which is adjustable a jockey unit $f$ which can be locked to the guide $a^2$ in any desired position of adjustment. A slide $f^1$ carrying a follower $b^2$ is freely movable along guides $f^2$ which, for all positions of angular adjustment, remain at right angles to the length of the guide $a^2$, a link $d^2$ angularly adjustable about the main axis $a^1$ carries the drum $c$ which is connected by the bands $b$ to the pin $b^1$ cooperating with the lever $e$ as described with reference to Figure 1, the lever $e$ being connected to the link $d^2$ at $d^1$. The slide $f^1$ is pivotally connected at $e^2$ to the lever $e$. Thus, having adjusted the jockey unit $f$ along the guide $a^2$ until the radial distance between the main axis $c^1$ and the follower $b^2$ is equal to the radius of the base circle corresponding to that of the involute to be generated, angular movement of the link $d^2$ about the axis $a^1$ (the base plate $a$ remaining fixed) will cause the follower $b^2$ to describe a path (for example $a^3$) corresponding to the said involute. With this arrangement it will be seen that the radius element, i. e., the part cooperating with the guide $a^2$, and the tangent element, that is to say the guides $f^2$, are formed as a single integral jockey unit.

Instead of employing a subsidiary drum, such as the drum $c$, the base plate or drum $a$ may be connected by the bands $b$ to two slides $b^3$ (Figures 3 and 4) slidable along guides $b^4$ on the link $d^2$. The slides $b^3$ carry pins $b^5$ bearing against opposite ends of a lever $e^2$ pivoted at $d^1$ on the link $d^2$ and carrying a guide $e^3$ engaged by a three point roller unit $e^5$ connected to the slide $f^1$.

The involute generating apparatus according to the invention may either be used in conjunction with an existing machine or may be employed by itself, and examples of both such practical applications are described below. One example of a practical utilisation of the invention is for generating involutes on gear teeth or shaping tools by employing the involute generating attachment in conjunction with a copying machine of the kind in which the relative movement between a work support and a tool support is an exact reproduction of the relative movement between a copy support and a tracer.

The invention is, however, particularly applicable to, and will now be described in conjunction with, a copying machine as described in the specification of United States of America patent application Serial No. 555,180, filed September 21, 1944, in the name of the present applicant, the involute generating attachment being substituted for the attachment for generating circular arcs as described in the said application.

As shown in Figures 5 to 11 the machine comprises a fixed base or pedestal A provided inside its upper end with four sets of rollers $A^1$ each set comprising a pilot roller $A^2$ (Figure 10) with its axis vertical and two rollers $A^3$ carried by a bracket $A^4$ pivoted at $A^5$, the axes of rotation of the rollers $A^3$ being inclined at an angle of approximately 60° to the axis of rotation of the pilot roller $A^2$. Secured beneath a basic slide B are four bearing strips $A^6$ each having its opposite surfaces mutually inclined at an angle of 60° so as to cooperate with the rollers $A^2$, $A^3$ within the base A. Arranged in the basic slide B are four further sets of rollers $A^2$, $A^3$ cooperating, as above described, with bearing strips $A^6$ beneath the carriage C, these strips being at right angles to those beneath the basic slide B. The basic slide B and the main carriage C are thus horizontally movable relatively to each other in two mutually perpendicular directions, so that the carriage C is capable of translational movement in all horizontal directions relatively to the fixed base A whilst the carriage C always remains parallel to itself. The adjustment of the carriage C relatively to the basic slide B is indicated on a coarse setting scale $C^1$ (Figure 11) marked on a transparent window carried by the carriage C and cooperating with an index $C^2$ on a second window $C^3$ carried by the basic slide B and illuminated from below by a lamp $C^4$ arranged within a suitable casing $C^5$. A similar coarse setting scale $B^1$ is marked on a transparent window carried by the slide B and cooperating with an index on a second window carried by the base A and illuminated from below by a lamp arranged within a suitable casing $B^5$.

Translational adjustments of the carriage C and basic slide B are effected by feed screws operated by hand wheels $C^6$, $B^6$ respectively lying at the front of the machine so as to be immediately accessible to the operator. The feed screws operated by the hand wheels $B^6$, $C^6$ can, at will, be rendered inoperative by releasing the locking levers $B^7$, $C^7$.

Arranged on the main carriage C are the upper and lower bearings $D^{11}$, $D^{12}$ for a work shaft D (Figure 7) carrying at its upper end a work table E for supporting the work, the shaft D having secured thereto a drum F through which angular movement is transmitted to the work table E, as described below.

The work table E is furnished with a toothed rim $E^1$ engaged by a horizontal pinion operated by a thumb screw $E^4$ (Figure 5) whereby the work table can be turned about the axis of the shaft D and relatively thereto. The upper end of the shaft D has an integral flange $D^1$ which is secured to an annular body $D^2$ carrying an eccentric lock $D^3$ operated by a lever $D^4$ whereby a plate $D^5$, fulcrumed against the stud $D^6$ carried by the body $D^2$, acts on a stud $D^7$ carried by the table E which can, in this way, be locked to or released from the shaft D at will. The table E is provided with a pointer $E^2$ which cooperates with a scale $E^3$ carried by the body $D^2$ so that after accurate angular adjustment of the table E about the shaft D, the table can be locked in the desired position of adjustment by the lever $D^4$.

The carriage C is also provided with bearings $G^1$ for a second or copy shaft G (Figure 8) which is hollow throughout its length and carries at its upper end an open annular frame H, the shaft G also having a driving drum $F^1$ secured thereto. In addition to the bearings for the work and copy shafts D and G, the carriage C is furnished with bearings $J^1$, $J^2$ for a third shaft J (Figure 9), hereinafter referred to as the "control shaft," the three shafts D, G and J being located, as shown in Figure 6, with their vertical axes of rotation at the corners of an isosceles triangle.

The upper end of the control shaft J carries a radial flange $J^3$ having an inverted T-bolt $J^4$ which is loaded by a spring whereby the head of the bolt $J^4$ is urged upwards into engagement with an annular groove $F^3$ formed in a radial flange $F^7$ at the upper end of a drum $F^2$ journalled in the carriage C by bearings $J^5$. The shaft J can thus be locked to, or unlocked from, the drum $F^2$ by tightening or slackening the nut on the bolt $J^4$. Similarly, the flange $F^7$ has an annular groove $F^5$ in which lies the head of a T-bolt $F^6$ on the carriage C and spring loaded so that by releasing or tightening the nut on the bolt $F^6$ the drum $F^2$ can be released from or locked to the carriage C at will. The arrangement therefore not only provides for release of the shaft J from the drum $F^2$ but also release of the drum $F^2$ from the carriage C, so that the drum $F^2$ can be coupled to the shaft J or to the carriage C or to both the shaft J and carriage C.

As shown in Figures 6 to 9, the three shafts D, G and J are normally coupled for synchronous angular movement about their respective axes of rotation by means of an idler pinion I engaging the toothed drums F, $F^1$ and $F^2$.

The drum $F^2$ of the control shaft J is furnished at its base with a worm wheel $J^6$ (Figure 9) engaged by a worm $J^7$ operated by a hand wheel $J^8$, means (not shown) being provided for throwing the worm $J^7$ into or out of engagement with the worm wheel $J^6$ at will. Thus, assuming that the bolt $F^6$ has been released and the bolt $J^4$ tightened, operation of the hand wheel $J^8$, with the worm $J^7$ operative, will cause synchronous rotation of all three drums F, $F^1$ and $F^2$.

The tool which consists of a rotary grinding wheel K, is mounted on a horizontal shaft $K^1$ driven by an electric motor $K^2$ as shown in Figures 5 and 6. A casing $K^3$ carrying the shaft $K^1$ and motor $K^2$ is mounted on the head of a plunger (not shown) which is reciprocated in a cylinder forming part of a cross slide $K^4$ which can be adjusted on the slideway $K^5$ by means of a hand wheel $K^6$ in a direction parallel to the plane of the grinding wheel K in order to allow for wear of the wheel K.

Mounted on a bracket $L^1$ extending forwards from the back of the machine is a work microscope L, and a projection objective $L^2$ is similarly supported by a bracket $L^3$, the optical axis of the objective $L^2$ being deflected from the vertical by a mirror $L^5$ and thence by way of a mirror $L^6$ at the back of the machine to a translucent screen $L^4$. The distance between the vertical optical axes of the microscope L and projector objective $L^2$ is exactly equal to the distance between the axes of rotation of the work shaft D and copy shaft G, the plane containing the axes of rotation of the two shafts G and J when the machine is at zero setting as described below, being hereinafter referred to as the "primary plane" P—P. The plane containing the axes of the shafts D and J remains parallel to the primary plane P—P for all possible positions of adjustment of the main carriage C relatively to the fixed base A.

The copy frame H at the upper end of the copy shaft G carries a transparent grid M having delineated thereon two sets of lines which are mutually at right angles to each other as shown in Figure 12, these lines thus dividing the grid M into a number of equal squares after the manner of sheet of graph paper. The centre of the grid M lies in alignment with the axis of rotation of the copy shaft G that is to say in alignment with the optical axis of the projection objective $L^2$ when the carriage C is in its zero position with the line joining the axes of rotation of the shafts D and G in the primary plane indicated at P—P in Figure 6.

Angularly adjustable about the copy frame H is a spider $H^1$ having a radial arm $H^2$ carrying a traversing head $H^3$, furnished with a screw $H^5$. The screw $H^5$ engages a slide $H^6$ horizontally slidable in guides (not shown) carried by the spider $H^1$. The slide $H^6$ is provided with guides $H^{11}$, at right angles to the said guides on the spider $H^1$, and a second slide $H^7$ is adjusted along the guides $H^{11}$ by a head $H^4$ carried by the slide $H^7$ and operatively connected to the slide $H^7$ through a screw similar to the screw $H^5$. The slide $H^7$ can be translationally adjusted in all directions in the horizontal plane. The slide $H^7$ carries a hood $H^8$ having a central opening or window $H^9$ surrounded by a flange or guard $H^{10}$. Detachably secured by the three studs $G^2$ (Figures 13 and 14) to the hood $H^8$ within the guard $H^{10}$ is a plate $G^3$ having a central window $G^4$. Three fixed fences $G^5$ and a movable fence $G^6$ pivoted at $G^7$ and provided with a resilient finger $G^8$ notched at $G^9$ for engaging one corner of a contour outline support $M^3$, e. g., a photographic transparency bearing a contour or outline $M^4$ which is to be copied. Thus the support $M^3$ is positioned over the window $G^4$ against the fixed fences $G^5$ whereupon the resilient fence or finger $G^8$ is moved into engagement with the support $M^3$ by turning an eccentric $G^{10}$. The contour $M^4$, having thus been firmly positioned over the window $G^4$, can be adjusted both rotationally by means of the spider $H^1$ and translationally by means of the heads $H^3$, $H^4$ to bring said contour into the desired position as described in more detail below.

Secured by means of lugs $H^{12}$ to the fixed base A of the machine and below the basic slide B is a coordinate setting unit as described in the specifications of United States of America patent applications Serial Numbers 553,067, filed September 7, 1944, and 555,180, filed September 21, 1944, both in the name of the present applicant, and comprising a housing N (Figure 8) having in its upper wall an opening $N^1$ whose central axis coincides with the axis of rotation of the copy shaft G when the carriage C is in its zero position. Secured by brackets $H^{13}$ to the base A is a housing for a lamp $N^2$ from which light is directed through a transparent fixed graticule $O^3$ carried by an end cap $O^4$ mounted on the base of the housing N. As shown in Figure 15 the fixed graticule $O^3$ has delineated thereon two scales $O^1$, $O^2$ which are mutually at right angles to each other. The origin O of these scales will, as hereinafter described, at all times represent a fixed origin or datum and also the operative edge of the tool K where this meets the work on the work table E and, preferably, one or more tool outlines $E^5$ are delineated on the graticule $O^3$ with the part of such outline which represents the operative part of the tool lying at the origin or datum O. Arranged in optical alignment with the origin O of the fixed graticule $O^3$ and with the axis of the opening $N^1$ are two optical systems $O^5$ (Figure 16) the upper system being housed within a tubular extension $N^3$.

Arranged within the housing N are two transparent movable graticules $P^1$, $P^2$ arranged face to face and which can be moved into alignment with the vertical optical axis, or can be removed therefrom as shown in Figure 16. The arrangement is such that when either or both graticules $P^1$, $P^2$ are in alignment with the optical axis, the fixed graticule $O^3$ and the movable graticule (or graticules) are imaged in the plane of the grid M, i. e., the reference plane. The movable graticules are carried by two slides $P^3$ (Figures 17 and 18) which are horizontally and relatively adjustable in two mutually perpendicular directions respectively parallel to the two scales $O^1$, $O^2$ of the fixed graticule $O^3$ as imaged in the reference plane. Each graticule slide $P^3$ comprises upper and lower movable members $P^4$, $P^5$ (Figures 17 and 18) and an intermediate fixed member $P^6$ carrying two ball cages the balls in which engage tracks in the members $P^4$, $P^5$. One of these tracks $P^7$ is curved in section whilst the other $P^8$ is flat so that centralisation of the slide on the ball tracks is determined by one track only. The two slides $P^3$ are adjusted along their tracks by two knurled heads $A^7$, $A^8$ (Figures 5 and 6) respectively acting through shafts $A^9$, $A^{10}$ and worm wheels $P^9$ keyed to operating discs $P^{10}$. Formed in the periphery of each disc $P^{10}$ is a slot $P^{11}$ engaged by one end of a push rod $P^{12}$ whose other end acts on the associated graticule slide $P^3$. Each slide is loaded by a centralising spring $P^{13}$ against which the push rod $P^{12}$ adjusts the slide to one side or the other of the central position.

The two scales $P^1$, $P^2$ of the movable graticules (Figures 19 and 20) whilst remaining at right angles with their point of intersection coincident with the optical axis when the slides $P^3$ are both in their central positions (as shown in Figure 18) are angularly displaced with respect to the scales $O^1$, $O^2$ of the fixed graticule $O^3$ by an angle whose tangent is represented by one division of the scale on the fixed graticule divided by the total length of the scale.

The fixed scales $O^1$, $O^2$, movable scales $P^1$, $P^2$, grid M and contour $M^4$ (when such is in position) are imaged by the projection objective $L^2$ on the screen $L^4$ as shown in Figure 16 though neither of the scales $P^1$, $P^2$ appears on the screen in this figure since both are withdrawn from the optical axis.

The apparatus thus far described may be employed in conjunction with an attachment for locating, in space, the centres about which circular arcs can be ground from basic data and independently of any outline or copy representation, the said attachment being applied to the control shaft J as described in the specification of United States of America Patent Application Serial No. 555,180, filed September 21, 1944, in the name of the present applicant. In accordance with the present invention, however, an involute generating attachment, as described with reference to Figures 1 to 4 is mounted on the control shaft J, this attachment being available for the dual purpose of setting the radii of circular arcs to be generated and for setting the machine to generate any desired involute. In this respect it will be understood that the appended claims are directed only to the apparatus when incorporating the involute attachment, whether this is for use in setting the centres of circular arcs to be generated or for setting the machine to grind a desired involute. Moreover, though this involute generating attachment is, in the example illustrated and described, applied to the control shaft J, it may be applied to the copy shaft or to the work shaft when circumstances permit since the three shafts D, G and J move in synchronism both rotationally and translationally.

As shown in Figures 21 to 23 the involute generating attachment comprises a base Q having a central internally screwthreaded boss $Q^1$ by which the base Q can be secured to the upper screwthreaded end of the spindle $J^{10}$ (Figure 9) so as to move both translationally and rotationally therewith. The axis of rotation $a^1$ of the base Q constitutes the main axis of the involute generating attachment, the base Q including an upward extension $Q^2$ which constitutes a base drum (equivalent to the base disc $a$ in Figures 3 and 4) coaxial with the main axis $a^1$. Angularly adjustable in a bearing $Q^3$ about the main axis $a^1$ is a cover plate $Q^4$ which, as shown in Figure 23, encloses the base drum $Q^2$ and is extended to one side of the main axis $a^1$ thus constituting an elongated link (corresponding to the link $d^2$ in Figures 3 and 4) interconnecting the relatively movable parts of the involute generating attachment as hereinafter described.

Mounted to slide on anti-friction rollers $Q^5$ (Figures 21 and 22) in the link $Q^4$ are two slide bars $Q^6$ whose longitudinal axes are tangential respectively to diametrically opposite points on the base drum $Q^2$, the slide bars $Q^6$ being interconnected by a flexible band $Q^7$ anchored to the drum $Q^2$ by a block $Q^8$. A second bearing $R^1$ in the link $Q^4$ is so disposed with respect to the bearing $Q^3$ that the central longitudinal axis of the link $Q^4$ extends through the main axis $a^1$ and through the axis $d^1$ of the bearing $R^1$, the said central longitudinal axis lying midway between the two parallel slide bars $Q^6$ and parallel thereto. Mounted to turn about the axis $d^1$ of the bearing $R^1$ is a lever or control beam $R$ which, when the apparatus is in its central or zero position (in which it is located by a suitably disposed link stop as described below in connection with the operation of the involute attachment), extends at right angles to the central longitudinal axis of the link $Q^4$ as shown in Figure 21, the beam $R$ acting at opposite ends against two rollers $R^2$ carried by the slide bars $Q^6$ respectively. Thus, angular movement of the link $Q^4$ about the main axis $a^1$ will result not only in translational movement of the fulcrum of the beam $R$ about the main axis $a^1$, but also in angular movement of the beam $R$ about the fulcrum in accordance with the length of the flexible band $Q^7$ taken up on one side of the base drum $Q^2$ and unwrapped from the other side thereof, the distance between the beam fulcrum and the points of application between the beam $R$ and the rollers $R^2$ remaining equal to each other for all angular positions of the link $Q^4$ about the main axis $a^1$. For any given angular movement of the link $Q^4$ about the main axis $a^1$, therefore, the beam $R$ will turn about its fulcrum through an angle whose chord is equal to the length of the flexible band $Q^7$ which is unwrapped from the base drum $Q^2$, that is to say a chord represented by the expression $$\frac{\pi r \theta}{180}$$

wherein $r$ is the radius of the base drum $Q^2$ and $\theta$ is the angular adjustment of the link $Q^4$ about the main axis $a^1$.

Formed integral with the link $Q^4$ and disposed on the upper surface thereof is a radial guide or radius arm $Q^9$ which extends at right angles to the length of the link $Q^4$, the longitudinal axis of the radius arm extending through the main axis $a^1$ so that this arm always constitutes a diameter of the base drum $Q^2$. Longitudinally slidable along the radius arm $Q^9$ is a jockey unit comprising two elements formed integrally and at right angles to each other, namely, a radius element $Q^{10}$ parallel to the radius arm $Q^9$, and a tangent element $Q^{11}$ at right angles thereto. This right-angled unit can be adjusted along the radius arm $Q^9$ by means of a hand wheel $Q^{12}$ and feed screw carried by the radius arm, the point of intersection $b^2$ of the longitudinal axes of the radius element $Q^{10}$ and tangent element $Q^{11}$ being thus adjusted relatively to the main axis $a^1$. For accurately measuring this adjustment a linear dimension gauge $V$, for example as described in the specification of United States of America patent application Serial No. 543,536, filed July 5, 1944, in the name of the present applicant, is carried by the radius element $Q^{10}$ and cooperates with a fixed stop $V^1$ carried by the link $Q^4$.

Slidable on antifriction rollers $R^3$ along the tangent element $Q^{11}$ is a follower plate $R^4$ having near one end a conical socket $R^5$ for engagement by a spigot $S$ as shown in Figure 24. The spigot comprises a hollow spindle $S^1$ having its lower end tapered to fit firmly in the socket $R^5$, and a tension bolt $S^2$ threaded at its lower end to engage a correspondingly threaded boss $S^{13}$ carried by the plate $R^4$. The tension bolt $S^2$ has a tensioning head $S^3$ which, when tightened, causes the tapered lower end of the spindle $S^1$ to be firmly driven into the socket $R^5$. The hollow spindle $S^1$ is journalled in a support comprising a primary link $S^4$ (Figure 6) having an arcuate slot $S^5$ struck from an axis coaxial with a primary pivot $S^7$. The primary pivot $S^7$ is connected to the fixed base of the machine and a secondary link $S^9$ mounted to turn on a secondary pivot $S^8$ carries at its free end the spigot $S$ and has an arcuate slot $S^6$ coaxial with the primary pivot $S^7$. The spigot $S$ is thus adjustable in all directions horizontally within the limits of angular adjustment of the links $S^4$, $S^9$ which can be locked against angular movements about their respective pivots $S^7$, $S^8$ by lock nuts $S^{10}$ whose bolts extend through the slots $S^5$, $S^6$.

The axis of the socket $R^5$ constitutes the follower proper and is hereinafter referred to as the control centre $b^2$ at that end of the follower plate $R^4$ remote from the control centre $b^2$ is a bogie $R^6$ having three rollers $R^7$ which simultaneously engage, by a three-point contact, longitudinal guides $R^8$ formed in the beam $R$. Thus, the connection between the follower plate $R^4$ and the beam $R$ is free to slide along the beam, this connection and therefore the control centre $b^2$, describing an involute corresponding to the above expression as the link $Q^4$ is turned about the main axis $a^1$, the value $r$ being the radius of the base circle set with the assistance of, the linear dimension gauge $V$, between the main axis $a^1$ and the point of intersection of the longitudinal axes of the radius element $Q^{10}$ and tangent element $Q^{11}$ of the right angled jockey unit.

The gauge $V$ is of the electromagnetic type described in the specification of United States of America patent application Serial No. 543,536, filed July 5, 1944, in the name of the present applicant, that is to say comprising two balanced coils $T^1$, $T^2$ (Figure 25) and an armature element $T^3$, relative movement of these elements causing relative variation in the reluctance of the magnetic circuits of the two coils $T^1$, $T^2$ which are connected across the secondary $T^4$ of a transformer whose primary $T^5$ is connected to a suitable source of alternating current. Relative variation of the reluctance of the coils $T^1$, $T^2$ causes corresponding operation of a measuring instrument $T^6$ which is connected between the point of interconnection of the coils $T^1$, $T^2$ and a tapping on a resistance $T^7$ across the secondary circuit of the transformer $T^5$. The instrument $T^6$ is connected to the coils through flexible leads taken through a tubular coupling $T^8$ (Figure 21).

The machine above described may be employed for a variety of operations in addition to that of generating involutes, and since these additional operations are to some extent allied with the operation of involute generation, such additional operations will first be described.

In order to grind a work-piece, which has been positioned on the work table $E$, in accordance with a given contour or outline, say, the outline M⁴ indicated in Figures 13 and 16, the involute generating attachment associated with the control shaft J can be removed from the machine since it is not employed for this operation. Having set the machine to zero by locking the levers B⁷, C⁷ and operating the hand wheels B⁶, C⁶ until the scales B¹, C¹ read zero, the fixed graticule scales O¹, O², the grid lines M¹, M², and the tool outline E⁵ will be imaged on the screen L⁴ as shown in Figure 16, the origin O of the fixed graticule scales constituting a fixed datum or tracer which may be regarded as representing the operative edge of the tool K, i. e., that point thereof which lies in alignment with the optical axis of the work microscope L. The transparent contour support M³ having been laid against the fences G⁵ and gripped in position by operating the eccentric G¹⁰, the contour M⁴ is brought accurately tangential to the tool outline E⁵ by turning the spider H¹ for angular adjustment and by operating one or each of the traversing heads H³, H⁴ to effect translational adjustment. The images now appear on the screen as shown in Figure 16, and, the bolt F⁶ being released, whilst the worm J⁷ is operative, the hand wheels B⁶, C⁶ and J⁸ are operated so as to cause the origin or tracer O (i. e., the operative edge of the tool outline E⁵) to follow the outline M⁴ on the screen. The tool will then accurately grind the workpiece in accordance with the outline M⁴, the scale of reproduction being in accordance with the optical ratio of the projection system.

Though it will usually be preferred to utilise the optically projected images for such direct copying, a copy microscope or a stylus may be substituted for the projection objective L² and the copy outline M⁴ on the support M³ (or a finished sample which is to be copied) followed by the copy microscope or tracer. Similarly, the outline M⁴ and also an outline or silhouette of a finished sample may be projected on the screen L⁴ for visual comparison of the two outlines on the screen. Further, having projected the contour M⁴ (or a silhouette of an accurate sample) on the screen, the work may be observed step by step through the work microscope L.

Another use of the machine is for the checking or generation of straight lines on finished work or on a workpiece. For example, as shown in Figures 26 and 27, assuming that a straight line l¹ is to be generated on a workpiece l, such line lying at a vertical distance l² from the centre of the work table E, the carriage C is first brought to its zero position, i. e., with the centre of the work table E in accurate alignment with the optical axis of the work microscope L and the origin O lying on a point of intersection of two of the grid lines M¹, M² as viewed on the screen L⁴ whilst two sets of grid lines lie accurately parallel respectively to the two fixed graticule scales O¹, O². Having locked the levers B⁷, C⁷ and also the pin F⁶ and released the latch D⁴, the table E is turned by the pinion E⁴ through the angle α as measured on the scale E³, and the table E is relocked in this position by locking the latch D⁴. The required line l¹ is now accurately parallel to the primary plane P—P as shown chain-dotted in Figure 27. The lock C⁷ is now engaged and the hand wheel C⁶ is operated so as to adjust the carriage C towards the operator until the grid line M² upon which the origin O previously rested has moved along the south portion of the fixed graticule scale O¹, as viewed on the screen, through the distance l². The work is then in the position shown in full lines in Figure 27, and grinding along the line l¹ can proceed by traversing the carriage C by means of the hand wheel B⁶. When the distance l² is not a round number directly measurable on the fixed graticule scale O², the fine setting scale P² may be brought into use as described below.

Figure 28:
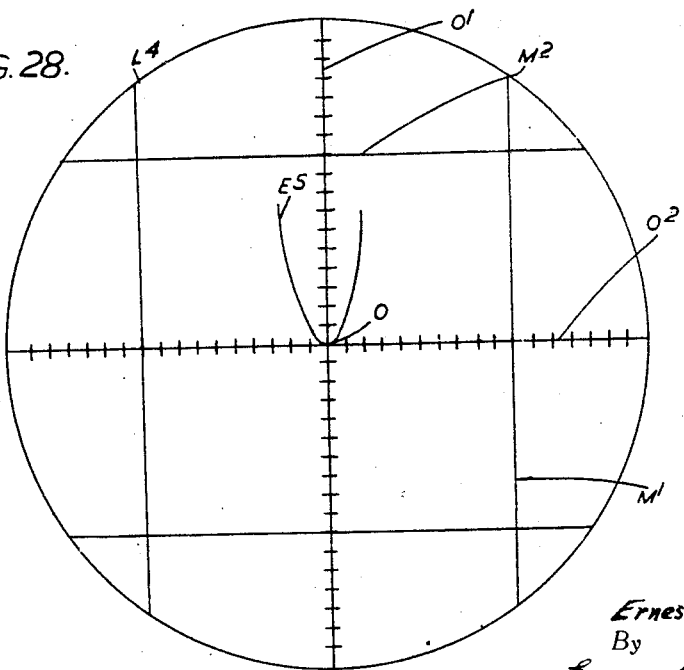
Figure 29:
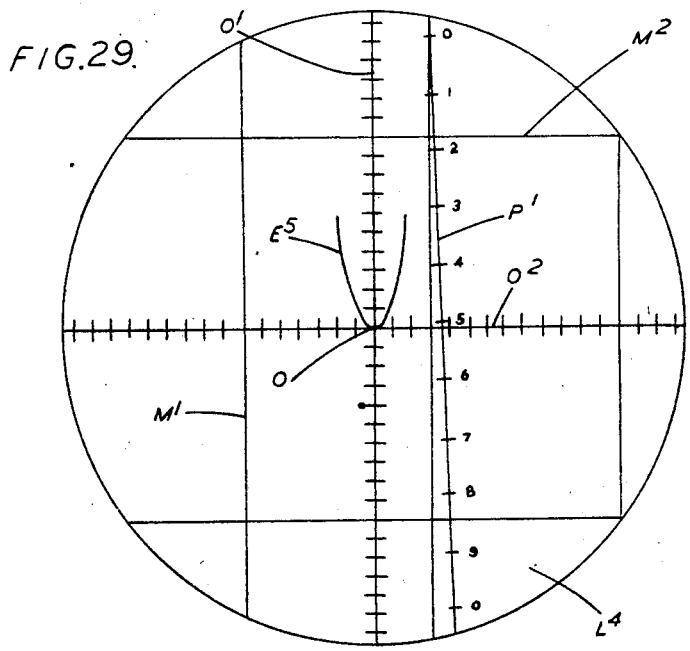
Figure 30:
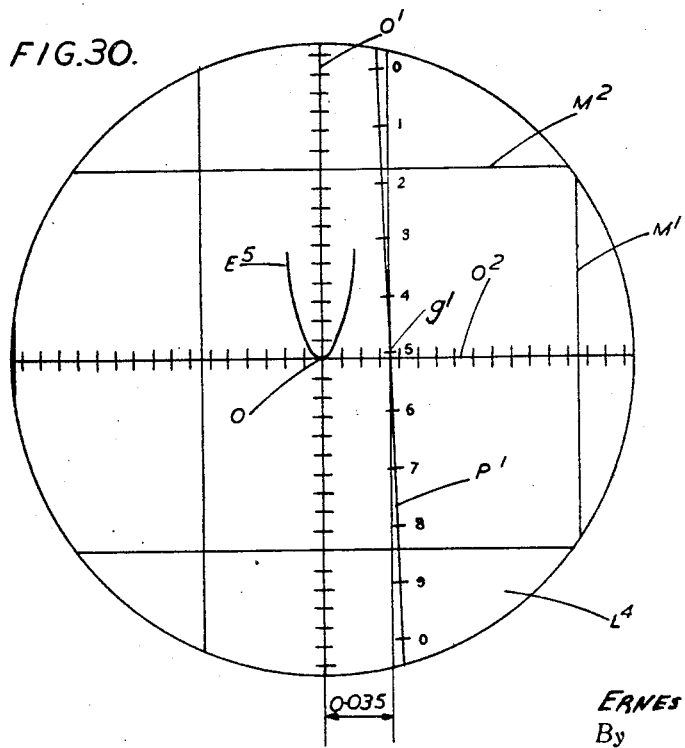

Assuming that it is necessary to set the work relatively to the tool K in accordance with a point whose position relatively to the origin or datum O is given by any two Cartesian coordinates, say 0.135 and 0.1475, the carriage C is first brought into its zero position so that the fixed scales O¹, O² lie in coincidence with two crossing grid lines M¹, M² respectively on the screen L⁴ as shown in Figure 28, the inclined fine setting scales P¹, P² having been adjusted so that neither appears on the screen. The scales B¹ and C¹ now both read zero, the bolt F⁶ and the latch D⁴ being both locked. The carriage C is adjusted, say, towards the operator, by the handwheel C⁶ until the coarse setting scale C¹ reads "1." The fixed scales O¹, O² will now be superimposed on another pair of grid lines M¹, M² the appearance on the screen L⁴ being the same as that shown in Figure 28. The basic slide B is then adjusted in the same direction as before until the grid line M¹ lying in registration with the scale O¹ (or any other grid line M¹) has moved along the scale O² through three graduations which represent a setting of 0.03 as shown in Figure 29, whereupon the graticule P¹ is brought on to the screen until the zero of the scale P¹ lies on any convenient grid line M¹. By again adjusting the basic slide B in the same direction until the grid line M¹, upon which the zero of the scale P¹ is resting, intersects the scale P¹ at g¹, namely, the point "0.005" thereon as shown in Figure 30, the setting of the coordinate 0.135 is complete as represented by the grid line M¹ lying immediately to the right of the origin O. To complete the second coordinate setting the carriage C is adjusted until the grid line M² previously lying in registration with the scale O² (or any other grid line M²) has moved along the scale O¹ through four graduations which represent a setting of 0.04 as shown in Figure 31, and, the scale P¹ having been faded off the screen, the scale P² is brought on until the zero thereof lies on any convenient grid line M². The carriage C is finally adjusted until the grid line M² upon which the zero of the scale P² is resting intersects the scale P² at g², namely, the point "0.0075" thereon as shown in Figure 32. The centre of the work table E will now lie in a position relative to the operative edge of the tool K represented by the two Cartesian coordinates 0.135 and 0.1475.

In each of the methods of operation now to be described the term "zeroing" will be employed to indicate that the machine as a whole is set in the zero position by bringing the axis of the work support D into alignment with the optical axis of the work microscope L and effecting similar centralisation of the copy support G with the projection objective L² by observing the images of the fixed graticule O³ and grid M on the projection screen L⁴, the grid M having been orientated as required with respect to the work and the link Q⁴ of the involute generating attachment set in its zero position, that is to say with the radius arm Q¹⁰ at right angles to the primary plane and the control centre b² in accurate coincidence with the axis of the control shaft J, the gauge V then giving zero reading.

Assuming that it is desired to employ the copying machine for translatory grinding of a convex involute curve on a gear tooth, using a grinding wheel K (Figure 33) whose operative edge is formed to a radius $r'$, the base of the involute attachment is secured to the upper end of the control shaft J and the zeroing of the machine is effected the instrument $T^6$ reading zero with an abutment block $V^2$ inserted against the stop $V^1$. The drum $F^2$ on the control shaft J (hereinafter referred to as the "control drum") is locked to the carriage C by the bolt $F^6$ and the link $Q^4$ of the involute attachment is locked to the carriage by a link stop $R^9$ (Figure 34). The link stop $R^9$ is constituted by a plug which can be inserted in either of two holes formed in the carriage C and lying on opposite sides respectively of the link $Q^4$ when this is in its central or zero position. Both the levers $B^7$, $C^7$ are now locked so as to prevent free translational adjustment of the slide B and carriage C. The flange $J^3$ of the control shaft J having been released from the control drum $F^2$, the spigot supporting linkage $S^4$, $S^9$ is released. A gauge block or pack $V^{10}$ having the dimension $(r)$, equal to the radius of the base circle corresponding to the involute to be generated, is inserted between the abutment block $V^2$ and the feeler rod of the linear dimension gauge V, the jockey unit is adjusted by the hand wheel $Q^{12}$ until the indicating instrument, $T^6$ again reads zero and the spigot S is introduced into the socket $R^5$ and the spigot linkage relocked, the parts being now in the positions shown in Figure 34.

The socket $R^5$ carried by the follower plate $R^4$ is adjusted through the distance $r'$ by operation of the handwheel $B^6$, this adjustment being made with the assistance of the graticule scales and grid as projected on the screen $L^4$. With the spigot linkage $S^4$, $S^6$ released, the carriage C is adjusted through the distance $(r-r')$ (Figure 35) so as to bring the centre of curvature of the operative edge of the grinding wheel K on to the base circle of the tooth to be ground. The flange $J^3$ on the control shaft J is now relocked to the control drum $F^2$, the link $Q^4$ of the involute attachment released from the carriage C, and the gear wheel (indicated at W) is clamped on the work table with the gear wheel coaxial with the work shaft D. Having turned the gear wheel W about the work shaft axis until the radial flank of the tooth to be ground passes the origin of the work microscope L by the amount corresponding to the grinding allowance, the work table E is finally clamped and grinding can proceed.

The position of the operative edge of the grinding wheel K relatively to the work W will be determined by the loci of the control centre $b^2$ which, in turn, will follow the convex involute corresponding to the base circle as the link $Q^4$ is turned about the main axis $a^1$. As the link $Q^4$ is swung from the zero position through an angle $(\theta)$ the fulcrum of the beam R moves translationally through the same angle about the main axis $a^1$, and one end of the beam R adjacent to the point of connection with the follower plate $R^4$ moves towards or away from the base disc by a distance corresponding to the expression $$\frac{\pi r \theta}{180}$$

The control centre $b^2$, i. e., the centre of the socket $R^5$ in the follower plate $R^4$, will describe the involute curve corresponding to the base circle of radius $r$. Since, however, the control centre $b^2$ is fixed, in space, by the anchoring spigot S, this involute will be described on the work by the tool K by angular and translational adjustment of the three shafts D, G and J due to movements of the involute attachment.

For grinding different involutes, that is to say involute curves corresponding to different base circles, it is only necessary to adjust the jockey unit by means of the hand wheel $Q^{12}$ to the corresponding radii of the base circles. The same involute generating attachment can thus be used for a wide range of involute curves. Moreover, the copying machine can be utilised not only for checking and setting points on the work, but the jockey unit may be utilised for setting the radii of circular arcs to be ground.

Apart from the apparatus providing for the generation of widely differing involute curves, it will be appreciated that the involute corresponding to the base circle whose radius is set by adjustment of the jockey unit can be generated either from left to right or from right to left by operating the link $Q^4$ about the main axis $a^1$ in the clockwise or anti-clockwise direction relatively to the central or zero position.

In order to generate, by translatory grinding, a concave or reentrant involute curve, for example on a shaping tool $W^1$ (Figure 36) and again employing a grinding wheel W whose operative edge is formed to a radius $r'$, the method of setting is the same as that described for grinding a convex involute curve, except that instead of setting the carriage C through the distance $(r-r')$ the carriage is adjusted through the distance $(r+r')$ (Figure 38) in the opposite direction to bring the centre of curvature of the operative edge of the grinding wheel K on to the base circle. Having locked the flange $J^3$ on the control shaft J to the control drum $F^2$ and released the link $Q^4$ of the involute attachment for angular movement relatively to the carriage C, the tool $W^1$ to be ground is located on the work table E with the tip of the tool $W^1$ encroaching over the origin of the work microscope L by an amount $(x-r)$ Figure 37, i. e., equal to the difference between the base circle radius $(r)$, and the value X, i. e., the root radius to be ground on the tool less the grinding allowance. The centre line of the tool $W^1$ having been set accurately radial with the work shaft axis, it is clamped in position on the work table E. The work table E is now adjusted about the work shaft D until the radial flank of the surface to be ground at the tip of the tool oversteps the appropriate line of the work microscope graticule by the amount of the grinding allowance and the work table E is clamped up. Translatory grinding of the said surface of the tool $W^1$ to be ground can now proceed.

When employing a grinding wheel having a beveled or chisel edge, translatory grinding for example of a gear tooth, can again be effected by the same settings as those described with reference to Figures 33 to 35 but since the grinding wheel radius $r'$ is not present, the follower is adjusted as above described through the distance $r$ but the adjustment of the carriage C is the simple measurement $(r)$ whereby the operative edge of the grinding wheel K is brought on to the base circle.

The attachment may also be employed for gyratory grinding of involute curves. For example, a grinding wheel K whose operative edge is in rack tooth form may be caused to grind a convex involute curve on a gear wheel tooth $W^2$ as shown in Figures 39 and 40. To this end, having set the apparatus with the instrument $T^6$ reading "Zero" against an abutment block $V^4$ (Figure 39), the levers $B^7$, $C^7$ are locked and a gauge block or pack $V^{10}$ having the dimension $r^2$ equal to the pitch radius of the tooth to be ground is inserted between the abutment block $V^4$ and the feeler of the linear dimension gauge V (Figure 40), and the jockey unit $Q^{10}$, $Q^{11}$ is adjusted until the indicating instrument $T^6$ again reads zero. The link $Q^4$ is now held in the zero position relatively to the carriage C by the stop $R^9$. The carriage C is next adjusted through the distance $(r^2-r^3)$ to bring the pitch circle of the gear wheel $W^2$ into the primary plane P—P (Figure 41), where $(r^3)$ is the dedendum of the tooth to be ground, the rack line (i. e., the plane in which the pitch circle of the gear wheel rolls) of the operative edge of the grinding wheel K being thus correctly positioned with respect to the base circle of the tooth. Having inserted the spigot S into the socket $R^5$ and clamped the linkage $S^4$, $S^9$, the flange $J^3$ of the control shaft is locked to the control drum $F^2$, the link $Q^4$ of the involute attachment is released, and the control drum $F^2$ is released from the carriage C. The gear wheel $W^2$ to be ground is accurately located with the base circle of the wheel accurately coaxial with the work shaft axis and with the centre line of the space between two adjacent teeth in alignment with the radial centre line of the grinding wheel K. Having locked the carriage C against movement perpendicular to the primary plane P—P grinding can proceed by actuation of the worm $J^7$ and hand wheel associated with the control shaft J.

The attachment may also be employed for grinding involute curves on the operative edges of abrasive wheels. For example, in order to set the apparatus for translatory grinding of a concave or reentrant involute curve on a grinding wheel K (Figures 42 and 43) the apparatus is first set to zero (Figure 42) as described and employing a gauge block $V^{10}$ having the dimension $r$. Having released the flange $J^3$ of the control shaft J from the control drum $F^2$, and also released the spigot linkage $S^9$ the jockey unit is adjusted by the handwheel $Q^{12}$ until the instrument $T^6$ again reads "Zero" (Figure 43). The dimension $r$, which is the radius of the base circle upon which the desired involute is based, is set towards the operator as shown in Figure 43 by means of the hand wheel $Q^{12}$. The spigot S is inserted in the socket $R^5$ and the spigot linkage $S^9$ is locked, and the link $Q^4$ is locked in the centralised position by the link stop $R^9$ with the spigot linkage $S^4$, $S^9$ and the levers $B^7$, $C^7$ released the hand wheel $B^6$ is now operated so as to adjust the slide B through the distance $y$ parallel to the primary plane P—P, and the spigot linkage $S^4$, $S^9$ is reclamped, the distance $y$ being equal to half the thickness of the grinding wheel K as measured in and parallel to the primary plane. A grinding diamond $K^{15}$, carried by a holder supported on the carriage C so as to lie over the work table E should now lie with its point touching the central origin of the work microscope graticule. Having released the levers $B^7$, $C^7$ and locked the flange $J^3$ of the control shaft J to the control drum $F^2$, the link $Q^4$ of the involute attachment is released for angular movement relatively to the carriage C and translatory grinding can proceed.

The method of setting for grinding a convex involute surface on the edge of a grinding wheel is similar to that described for the reentrant curve, but instead of setting the jockey unit $Q^{10}$, $Q^{11}$ through the distance $r$ towards the operator, this setting is effected away from the operator.

Involute generating apparatus according to the invention may be utilised for checking involute curves, e. g., samples or copies which have been or are to be reproduced. To this end, in one arrangement as shown in Figure 44 the base plate $A^{16}$ carrying the base disc or drum (not shown) constitutes the fixed base of the machine which also carries a copy table $H^{16}$ disposed horiontally over the main axis. The follower slide $R^4$ carries a bracket $Q^{17}$ which supports a projection objective $L^{16}$ with its optical axis vertical and in alignment with the control center of the follower slide $Q^{16}$. Mounted on the bracket $Q^{17}$ is a projection screen $L^{17}$ upon which is thus projected the outline of the sample outline to be checked and carried by the copy table $H^{16}$. By setting the apparatus in accordance with the involute curve of the copy or sample to be tested and swinging the link $Q^4$ about the main axis a datum point on the screen $L^{17}$ will move relatively to the image of the projected outline thereon, divergencies of the datum point from the projected image indicating inaccuracies of the sample or copy outline.

It will be appreciated that checking of a finished outline may also be effected by visual readings from an indicating instrument actuated in accordance with movements of the follower. For example, the follower slide may actuate a lever or feeler mounted on a spring ligament support and operatively connected to a mechanical or electrically controlled indicating or recording instrument.

It will be appreciated that the constructions, and methods of use, described above are given by way of example only and that details of construction, arrangement and use may vary widely in practice. For example, through the arrangement described for grinding an involute curve on the work includes a grinding or abrasive wheel, the nature of the tool employed will depend on the operation to be performed and the tool may consist, for example of an end mill for grinding or cutting the work or of a stylus or other marking device for imparting surface markings to the work. According to one method of use the involute generating apparatus used per se may include a marking stylus whereby a workpiece carried by the work table has the generating involute marked thereon by the stylus.

When the involute generating attachment according to the invention is attached to a copying machine of the kind referred to above, the reproduction ratio of the machine may be either of unity ratio or may have an inherent magnification ratio determined, for example, by mechanical means such as a pantograph, by optical means such as the magnification ratio of a projection objective, or by a combination of such mechanical and optical means. If, however, the involute generating apparatus is to be employed in conjunction with a copying machine whose range of operation is to include straight lines and circular arc generation (either for operating on or checking work) it is preferred to employ the involute generating apparatus for the dual purpose of circular arc and involute curve generation, and to this end the jockey unit $Q^{10}$, $Q^{11}$ carrying the follower slide $R^4$ may be constructed and arranged in a manner generally similar to the jockey unit described in the specification of United States of America patent application Serial No. 552,915, filed September 6, 1944, in the name of the present application. Where, however, economy of space is not of importance, the involute generating attachment may be mounted on a separate shaft which moves translationally and rotationally in unison and synchronism with the work shaft and copy shaft of the copying machine, and with a third or control shaft when such is employed.

As will be readily seen, apparatus according to the invention, whether used alone or in conjunction with other apparatus, for generating or checking involutes is mainly of advantage in that a wide variety of involute curves can be generated by effecting a simple adjustment of the right-angled jockey unit, thus obviating the necessity for setting up a separate basic element for each different involute curve. Further, the desired involute may be generated in one direction or the other with respect to the base circle without modification or adjustment of the apparatus.

What I claim as my invention and desire to secure by Letters Patent is:

1. Apparatus for generating involutes, comprising a circular base disc, a link, said base disc and link being relatively rotatable about a common main axis coincident with the centre of the base disc, a subsidiary disc mounted to rotate on the link and having a radius equal to that of the base disc, a flexible band interconnecting the circumferences of the discs, a lever fulcrumed on the link between the axes of the two discs, means interconnecting the lever to the flexible band, a radius element mounted to pivot about the main axis and whose effective length is equal to the radius of the base circle corresponding to the involute to be generated, means whereby the effective length of the radius element can be adjusted at will, a tangent element connected at right angles to the radius element and tangential to the base disc, a follower movable along the tangent element, and means interconnecting the follower and a part of the lever between the fulcrum and the part connected to the flexible band, relative angular movement between the base disc and the link about the main axis causing the lever to move both angularly about its fulcrum and translationally about the main axis in accordance with the said relative angular movement of the link and base disc, the lever thus causing the follower to describe the involute corresponding to the selected base circle.

2. Apparatus for generating involutes, comprising a circular base disc, a link, said base disc and link being relatively rotatable about a common main axis coincident with the centre of the base disc, a lever fulcrumed on the link, subsidiary pivots on the lever equidistant from and lying on opposite sides of the fulcrum respectively, at least one flexible band extending tangentially from the circumference of the base disc on opposite sides thereof and connected to said subsidiary pivots, a radius element mounted to pivot about the main axis and whose effective length is equal to the radius of the base circle corresponding to the involute to be generated, a tangent element connected at right angles to the radius element and extending tangentially to the base circle, a follower movable along the tangent element, and means connecting the follower to a part of the lever between the fulcrum and one of said subsidiary pivots, relative angular movement between the base disc and link about the main axis causing the lever to move both angularly about its fulcrum and translationally about the main axis in accordance with the said relative angular movement of the link and base element, the follower being thus caused to describe the involute corresponding to the base circle.

3. Apparatus as claimed in claim 2, having means for adjusting the effective length of the radius element at will.

4. Apparatus for generating involutes, comprising a circular base drum, a link, said base drum and link being relatively movable about a common main axis coincident with the axis of the drum, two guides on the link, said guides being parallel to each other and tangential to opposite sides of the drum respectively, a lever fulcrumed on the link, two abutments slidable along the said guides and operatively engaging the lever at parts thereof equidistant from and lying on opposite sides of the fulcrum, respectively, at least one flexible strip extending tangentially from the circumference of the drum on opposite sides thereof and connected to said sliding abutments, a radius element mounted to pivot about the main axis and whose effective length is equal to the radius of the base circle corresponding to the involute to be generated, a tangent element connected at right angles to the radius element and extending tangentially to the base circle, a follower movable along the tangent element, and means connecting the follower to a part of said lever between the fulcrum and one of the sliding abutments, relative angular movements of the base drum and link about the main axis causing the lever to move both angularly about its fulcrum and translationally about the main axis in accordance with the said relative angular movement of the link and drum, the follower being thus caused to describe the involute corresponding to the base circle.

5. Apparatus for generating involutes, comprising a circular base drum, a link, said base drum and link being relatively movable about a common main axis coincident with the axis of the drum, two guides on the link, said guides being parallel to each other and tangential to opposite sides of the drum respectively, a lever fulcrumed on the link, two abutments slidable along the said guides and operatively engaging the lever at parts thereof equidistant from and lying on opposite sides of the fulcrum, respectively, at least one flexible strip extending tangentially from the circumference of the drum on opposite sides thereof and connected to said sliding abutments, a radius element mounted to pivot about the main axis and whose effective length is equal to the radius of the base circle corresponding to the involute to be generated, means for adjusting the effective length of the radius element in accordance with any selected base circle, a tangent element connected at right angles to the radius element and extending tangentially to the base circle, a follower movable along the tangent element, and means connecting the follower to a part of said lever between the fulcrum and one of the sliding abutments, relative angular movement of the base drum and link about the main axis causing the lever to move both angularly about its fulcrum and translationally about the main axis in accordance with the said relative angular movement of the link and drum, the follower being thus caused to describe the involute corresponding to the base circle selected.

6. Apparatus as claimed in claim 5, in which the lever is furnished with a guide parallel to the length of the lever, and the follower is connected to the lever through a pivot member freely slidable along the guide on the lever.

7. Apparatus for generating involutes, comprising a circular base element, a link, said base element and link being relatively rotatable about a common main axis coincident with the centre of the circular base element, a lever fulcrumed on said link, a guide on the lever parallel to the length thereof, interconnecting mechanism between the base element and the link, a radius element mounted to pivot about the main axis and whose effective length is equal to the radius of the base circle corresponding to the involute to be generated, a tangent element connected at right angles to the radius element and tangential to the base circle, a longitudinal guide on the tangent element, a follower movable along the guide on the tangent element, a pivot member freely slidable along the guide on said lever, said pivot member making a three-point contact with the guide on the lever at points thereon symmetrically disposed with respect to the longitudinal axis of the tangent element, and means interconnecting the follower and said pivot member, relative angular movement of the base element and link about the main axis causing the lever to move both angularly about its fulcrum and translationally about the main axis in accordance with the said relative angular movement of the link and base element, the follower thus describing an involute corresponding to the base circle.

8. Apparatus for generating involutes, comprising a circular base disc, a link, said base disc and link being relatively movable about a common axis coincident with the axis of the base disc, two guides on the link, said guides being parallel to each other and tangential to opposite sides of the base disc respectively, a lever fulcrumed on the link, a guide on the lever parallel to the length thereof, two abutments slidable along the parallel guides on the link and operatively engaging the link at parts thereof equidistant from and lying on opposite sides of the fulcrum, respectively, at least one flexible strip extending tangentially from the circumference of the base disc on opposite sides thereof and connected to said sliding abutments, a radius element mounted to pivot about the main axis and whose effective length is equal to the radius of the base circle corresponding to the involute to be generated, means for adjusting the effective length of the radius element in accordance with any selected base circle, a tangent element connected at right angles to the radius element and extending tangentially to the base circle, a guide on the tangent element and parallel to the length thereof, a follower movable along the guide on the tangent element, a pivot member freely movable along the guide on said lever, said pivot member making a three-point contact with the guide on the lever at points thereon symmetrically disposed with respect to the longitudinal axis of the tangent element, and means interconnecting the follower and said pivot member, relative angular movement of the base element and link about the main axis causing the lever to move both angularly about its fulcrum and translationally about the main axis in accordance with the said relative angular movement of the link and base element, the follower thus describing an involute corresponding to the base circle selected.

9. Apparatus as claimed in claim 2, in which the radius element and tangent element are formed as a single integral jockey unit which is adjustable, in the direction of the length of the radius element and radially with respect to the main axis, in accordance with the radius of the base circle corresponding to the involute to be generated.

10. Apparatus as claimed in claim 9, in which the radius element and tangent element are formed as a single integral jockey unit which is adjustable, in the direction of the length of the radius element and radially with respect to the main axis, in accordance with the radius of the base circle corresponding to the involute to be generated.

11. Apparatus as claimed in claim 8, having a radius arm mounted to rotate about and extending radially through the main axis and a guide on said arm parallel to the length thereof, the tangent element and radius element being formed as a single integral unit adjustable along the guide on the radius arm in accordance with the radius of the base circle.

12. Apparatus for generating involutes, comprising a circular base drum, a link, said drum and link being relatively movable about a common axis coincident with the axis of the drum, two guides on the link, said guides being parallel to each other and tangential to opposite sides of said drum respectively, a lever fulcrumed on the link, a guide on the lever parallel to the length thereof, two abutments slidable along the parallel guides on the link and operatively engaging the link at parts thereof equidistant from and lying on opposite sides of the fulcrum, respectively, at least one flexible band extending tangentially from the circumference of the drum on opposite sides thereof and connected to said sliding abutments, a radius arm mounted to turn about and extending radially through the main axis, a longitudinal guide on the radius arm, a jockey unit adjustable along said radius arm and comprising a radius element, parallel to the radius arm and whose effective length is equal to the radius of the base circle corresponding to the involute to be generated, and a tangent element at right angles to the radius element and extending tangentially to the said base circle, a linear dimension gauge on the jockey unit for measuring adjustment of the jockey unit along the radius arm and with respect to the main axis, such adjustment determining the effective length of the radius element, a guide on the tangent element parallel to the length thereof, a follower movable along the guide on the tangent element, a pivot member freely movable along the guide on the said lever, said pivot member making a three-point contact with the guide on the lever at points thereon symmetrically disposed with respect to the longitudinal axis of the tangent element, and means interconnecting the follower and said pivot member, relative angular movement of the base element and link about the main axis causing the lever to move both angularly about its fulcrum and translationally about the main axis in accordance with the said relative angular movement of the link and base element, the follower thus describing an involute corresponding to the base circle selected.

13. Apparatus for generating involutes, comprising a supporting base or table, a main carriage carried by the table, means whereby the carriage can be adjusted in all directions horizontally over the said table, a tool support carried by the table, a work support on the main carriage, a circular base element secured to a control shaft on the carriage, a link mounted to turn about the axis of the control shaft so that the base element and link are relatively rotatable about the said control axis, a lever fulcrumed on said link, interconnecting mechanism between the base element and the lever, a radius element mounted to pivot about the control axis and whose effective length is equal to the radius of the base circle corresponding to the involute to be generated, a tangent element connected at right angles to the radius element and tangential to the base circle, a follower movable along the tangent element, means connecting the follower to the lever, relative angular movement between the base element and the link about the control axis causing said lever to move angularly about its fulcrum and translationally about the control axis in accordance with the said relative angular movement of the link and base element, the lever thus tending to cause the follower to describe an involute corresponding to the base circle, an anchoring device carried by the supporting base or table, interconnecting means between the anchoring device and said follower, whereby the follower can be locked in space so that angular movement of the link about the control axis will cause the control axis to move relatively to the follower in accordance with the said involute, the resulting relative movement between the work support and the tool support being a reproduction of the relative movement between the control axis and the follower.

14. Apparatus for generating involutes, comprising a supporting base or table, a main carriage carried by the table, means whereby the carriage can be adjusted in all directions horizontally over the said table, a tool support carried by the table, a work support on the main carriage, a circular base element secured to a control shaft on the carriage, a link mounted to turn about the axis of the control shaft so that the base element and link are relatively rotatable about the said control axis, a lever fulcrumed on said link, a flexible band connecting the circumference of the circular base element to said lever, a radius element mounted to pivot about the control axis and whose effective length is equal to the radius of the base circle corresponding to the involute to be generated, a tangent element connected at right angles to the radius element and tangential to the base circle, a follower movable along the tangent element, means connecting the follower to the lever, relative angular movement between the base element and link about the control axis causing said lever to move angularly about its fulcrum and translationally about the control axis in accordance with the said relative angular movement of the link and base element, the lever thus tending to cause the follower to describe an involute corresponding to the base circle, an anchoring device carried by the supporting base or table, interconnecting means between the anchoring device and said follower, whereby the follower can be locked in space so that angular movement of the link about the control axis will cause the control axis to move relatively to the follower in accordance with the said involute, the resulting relative movement between the work support and the tool support being a reproduction of the relative movement between the control axis and the follower.

15. Apparatus as claimed in claim 14, in which the radius element and tangent element are formed as a single integral jockey unit which is adjustable, in the direction of the length of the radius element and radially with respect to the control axis, in accordance with the radius of the base circle corresponding to the involute to be generated.

16. Apparatus as claimed in claim 14, in which the radius element and tangent element are formed as a single integral jockey unit which is adjustable, in the direction of the length of the radius element and radially with respect to the control axis, in accordance with the radius of the base circle corresponding to the involute to be generated, and the jockey unit includes a linear dimension gauge for measuring the radial adjustment of the jockey unit relatively to the main axis.

17. Apparatus for generating involutes comprising a supporting base or pedestal, a main carriage mounted on the pedestal, means for translationally adjusting the main carriage horizontally in a direction parallel to a vertical primary plane, means for releasing the carriage so that it is freely movable in the said direction, means for adjusting the main carriage at right angles to the primary plane, means for releasing the carriage so that it is freely movable in the direction at right angles to said plane, a tool support carried by the pedestal with the operative edge of the tool lying in said primary plane, a work shaft rotatable on said carriage adjacent to the tool support, a work table carried by the work shaft, means for angularly adjusting the work table about the axis of and relatively to the work shaft, means for locking the work table in the angular position of adjustment relatively to the work shaft, a work microscope carried by the pedestal and whose origin lies in the primary plane and in alignment with the operative edge of the tool, a hollow copy shaft rotatable on the main carriage, a grid carried by the copy shaft, a coordinate setting unit carried by the pedestal and comprising fixed basic scales whose origin represents the operative edge of the tool, two fine setting scales, optical means which image the basic scales and fine setting scales in the plane of the grid, a screen carried by the pedestal, a projection objective carried by the pedestal and projecting on to said screen images of the grid and of the scales imaged thereon, a control shaft rotatable on the main carriage, interconnecting mechanism between the work shaft, copy shaft and control shaft whereby these three shafts rotate in synchronism about their respective axes, means for locking the control shaft to and releasing it from said interconnecting mechanism, means for locking the control shaft against and releasing it for angular movement relatively to the main carriage, a circular base drum secured to the control shaft and coaxial therewith, a link angularly movable about the axis of the control shaft, a lever fulcrumed on the link, a flexible strip connecting opposite ends of said lever to opposite sides of the base drum and tangential thereto, a radius arm on said link and extending radially with respect to the control axis, a jockey unit adjustable along said radius arm and comprising a radius element and a tangent element, a follower movable along guides on the tangent element, means interconnecting the follower and said lever between one end thereof and the fulcrum, a linear dimension gauge carried by the jockey unit, a stop carried by the link and cooperating with the linear dimension gauge, the jockey unit being adjusted along the radius element, with the assistance of the gauge, in accordance with the radius of the base circle corresponding to the involute to be generated, the tangent element being then tangential to such base circle, a spigot carried by the pedestal, a socket in said follower and engaged by the spigot which thus locks the follower, in space, in the required position of adjustment of the follower relatively to the axis of the control shaft, angular movement of the link about the control shaft axis causing movement of the control axis, relatively to the fixed axis of the follower, along a path corresponding to the involute to be generated, the resulting translational and rotational movement of the work table relatively to the tool being a reproduction of the translational and rotational movement of the control shaft relatively to the follower.

18. Apparatus for generating involutes, comprising a circular base element, a link, said base element and link being relatively movable about a common main axis coincident with the center of the circular base element, a lever fulcrumed on said link, interconnecting mechanism between the link and base element, a radius arm mounted to rotate about and extending radially through the main axis, a longitudinal guide on said radius arm, a jockey unit adjustable along the guide on the radius arm, said jockey unit comprising a tangent element and a radius element formed as a single integral unit, with the tangent element at right angles to the radius element and tangential to the base circle of the involute to be generated, means for adjusting the jockey unit along the radius arm and parallel to the radius element whose effective length is thus determined in accordance with the said base circle, a linear dimension gauge included in the jockey unit and comprising a feeler cooperating with a part fixed relatively to the radius arm, said feeler being movable relatively to the jockey unit in a direction radial with respect to the main axis, means whereby the movement of the feeler actuates an indicating instrument which thus measures the radial adjustment of the jockey unit relatively to the main axis, a longitudinal guide on the tangent element, a follower movable along the guide on the tangent element, and means interconnecting the follower and said lever, relative angular movement between the base element and link about the main axis causing the said lever to move angularly about its fulcrum and translationally about the main axis in accordance with the said relative angular movement of the link and base element, the lever thus causing the follower to describe an involute corresponding to the base circle selected.

19. Apparatus for generating involutes, comprising a circular base element, a link, said base element and link being relatively rotatable about a common main axis coincident with the center of the circular base element, a lever fulcrumed on the link, interconnecting mechanism between the base element and the lever, a radius element mounted to pivot about the main axis and whose effective length is equal to the radius of the base circle corresponding to the involute to be generated, a tangent element connected at right angles to the radius element and tangential to said base circle, a follower movable along the tangent element, means operatively connecting the follower to said lever, an indicating device comprising a projection screen having a datum thereon and moving as a unit with the follower, means whereby an outline of the involute to be generated is projected on said screen so that the movement of the follower can be visually checked against the said outline, relative angular movement of the base element and link about the main axis causing said lever to move both angularly about its fulcrum and translationally about the main axis in accordance with the said relative angular movement of the link and base element, the follower being thus caused to describe an involute corresponding to the base circle.

20. Apparatus for generating involutes, comprising a circular base element, a link, said base element and link being relatively rotatable about a common main axis coincident with the centre of the circular base element, a lever having a guide parallel to the length thereof fulcrumed on said link, interconnecting mechanism between the base element and the lever, a radius element mounted to pivot about the main axis and whose effective length is equal to the radius of the base circle corresponding to the involute to be generated, a tangent element connected at right angles to the radius element and tangential to the base circle, a follower movable along the tangent element, and means comprising a pivot member freely slidable along the guide of the lever connecting the follower to the lever, relative angular movement between the base element and link about the main axis causing the said lever to move angularly about its fulcrum and translationally about the main axis in accordance with the said relative angular movement of the link and base element, the lever thus causing the follower to describe an involute corresponding to the base circle.

ERNEST ALBERT COOKE.

REFERENCES CITED

The following references are of record in the file of this patent:

UNITED STATES PATENTS

| Number | Name | Date |
|---|---|---|
| 1,326,696 | Simmons | Dec. 30, 1919 |
| 1,135,780 | Drummond et al. | Apr. 13, 1915 |
| 2,237,975 | Wainwright | Apr. 8, 1941 |
| 2,185,546 | Flygare | Jan. 2, 1940 |
| 2,376,109 | Aeppli | May 15, 1945 |

FOREIGN PATENTS

| Number | Country | Date |
|---|---|---|
| 658,859 | Germany | Apr. 21, 1938 |